United States Patent
Bae et al.

(10) Patent No.: US 10,717,835 B2
(45) Date of Patent: Jul. 21, 2020

(54) BLOCK COPOLYMER, ION-EXCHANGE MEMBRANE AND METHOD OF PREPARING BLOCK COPOLYMER

(71) Applicant: KOREA INSTITUTE OF ENERGY RESEARCH, Daejeon (KR)

(72) Inventors: Byungchan Bae, Daejeon (KR); Sung-Dae Yim, Daejeon (KR); Chang-Soo Kim, Incheon (KR); Won-Yong Lee, Daejeon (KR); Gu-Gon Park, Daejeon (KR); Tae-Hyun Yang, Daejeon (KR); Seok-Hee Park, Daejeon (KR); Minjin Kim, Daejeon (KR); Young-Jun Sohn, Daejeon (KR); Seung-Gon Kim, Daejeon (KR); Dong Won Shin, Daejeon (KR); Adam Febriy-Anto Nugraha, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 334 days.

(21) Appl. No.: 15/490,159

(22) Filed: Apr. 18, 2017

(65) Prior Publication Data

US 2018/0134844 A1   May 17, 2018

(30) Foreign Application Priority Data

Nov. 16, 2016   (KR) .................. 10-2016-0152668

(51) Int. Cl.
| | | |
|---|---|---|
| *B01J 39/19* | (2017.01) | |
| *C08G 65/40* | (2006.01) | |
| *C08G 65/48* | (2006.01) | |
| *C08J 5/22* | (2006.01) | |
| *B01J 47/12* | (2017.01) | |

(52) U.S. Cl.
CPC ............. *C08J 5/2262* (2013.01); *B01J 47/12* (2013.01); *C08G 65/4025* (2013.01); *C08J 2371/10* (2013.01)

(58) Field of Classification Search
CPC ........ C08G 65/40; C08G 65/48; C08G 64/18; C08G 64/183; C08G 75/0245; C08G 81/00; C08J 5/22; B01J 39/19
See application file for complete search history.

(56) References Cited

U.S. PATENT DOCUMENTS

| | | |
|---|---|---|
| 7,893,303 B2 | 2/2011 | Yamakawa et al. |
| 2007/0292730 A1 | 12/2007 | McGrath et al. |
| 2010/0174042 A1 | 7/2010 | Yamakawa et al. |
| 2011/0065021 A1 | 3/2011 | Kitamura et al. |
| 2012/0129076 A1 | 5/2012 | Ichimura et al. |
| 2013/0108944 A1 | 5/2013 | Yang et al. |
| 2015/0314245 A1* | 11/2015 | Nakao .................... B01D 69/02 210/500.23 |

FOREIGN PATENT DOCUMENTS

WO   2007052954 A1   5/2007

OTHER PUBLICATIONS

Roy, A. et al. Polymer vol. 49 pp. 5037-5044 (Sep. 2008).*
Chen, S. et al. Polymer vol. 54 pp. 236-245 (Sep. 2012).*
Miyahara, T. et al. ACS Applied Materials & Interfaces vol. 4 pp. 2881-2884 (Jun. 2012).*
Umezawa et al. ACS Macro Letters vol. 1 pp. 969-972 (Jul. 2012).*
Nanwen Li et al. "Ion Transport by Nanochannels in Ion-Containing Aromatic Copolymers"; pubs.acs.org/Macromolecules 2014, 47, pp. 2175-2198.
Nakabayashi et al., Synthesis and Properties of Sulfonated Multiblock Copoly (ether sulfone)s by a Chain Extender. Journal of Polymer Science: Part A: Polymer Chemistry, vol. 46, pp. 3947-3957, (2008).

* cited by examiner

*Primary Examiner* — Irina S Zemel
*Assistant Examiner* — Jeffrey S Lenihan
(74) *Attorney, Agent, or Firm* — Sanberg Phoenix & von Gontard, P.C.

(57) ABSTRACT

A block copolymer, an ion-exchange membrane including the block copolymer and a method of preparing the block copolymer are provided. The block copolymer may include a hydrophobic repeating unit and a hydrophilic repeating unit.

13 Claims, No Drawings

BLOCK COPOLYMER, ION-EXCHANGE MEMBRANE AND METHOD OF PREPARING BLOCK COPOLYMER

CROSS-REFERENCE TO RELATED APPLICATIONS

This application claims the benefit of Korean Patent Application No. 10-2016-0152668 filed on Nov. 16, 2016, in the Korean Intellectual Property Office, the disclosure of which is incorporated herein by reference.

BACKGROUND

1. Field of the Invention

At least one example embodiment relates to a block copolymer, an ion-exchange membrane and a method of preparing the block copolymer.

2. Description of the Related Art

A polymer electrolyte membrane (PEM) that is one of key parts of a fuel cell may actually conduct hydrogen ions in the fuel cell and may be used as a critical part to determine an economic feasibility as well as a performance of the fuel cell.

To enhance the performance and stability of the fuel cell, research is actively being conducted on an enhancement in a performance and stability of the PEM. To enhance the performance of the PEM, a chemical and mechanical stability and a high ionic conductivity at a low humidity, together with a price competitiveness, are considered as very important factors.

PEMs may be classified into a fluorine-based PEM, a partially fluorine-based PEM, a hydrocarbon-based PEM, and the like. Nafion that is commercialized recently as a fluorine-based polymer has disadvantages of a low glass transition temperature due to a fluoridation structure and a high price due to a complex preparing process.

Research is being focused on development of a hydrocarbon-based polymer in a form of a block copolymer to compete with the above Nafion. A hydrocarbon-based PEM that uses the hydrocarbon-based polymer has an advantage of a low cost in comparison to the fluorine-based PEM.

For example, the hydrocarbon-based polymer in the form of the block copolymer may have a structure in which hydrophilic blocks and hydrophobic blocks are alternately connected, and accordingly may be excellent in a performance in a low humidity condition. An ionicity and a chemical structure of a hydrophilic block in which an ion-exchange functional group is introduced may have a decisive influence on an increase in an ionic conductivity, and it is advantageous to have as high ion exchange capacity (IEC) as possible.

For example, a polyphenylene polymer may be excellent in a chemical stability, because the polyphenylene polymer does not include an aryl-ether bond that is known to be the most chemically vulnerable in an existing aromatic hydrocarbon-based polymer. However, the polyphenylene polymer may have a low processability due to a poor solubility, and have low mechanical properties due to a low molecular weight.

SUMMARY

The present disclosure is to solve the foregoing problems, and an aspect provides a block copolymer that may have enhanced mechanical properties and enhanced solubility to be excellent in a processability, due to an introduction of a polymer chain extension ring.

Another aspect provides an ion conductive block copolymer that may have a high ionic conductivity.

Still another aspect provides a polymer electrolyte including the ion conductive block copolymer.

Yet another aspect provides an ion-exchange membrane including the polymer electrolyte.

A further aspect provides an ionomer binder including the block copolymer.

A further aspect provides a fuel cell including the ion-exchange membrane and/or the ionomer binder.

A further aspect provides a method of preparing the block copolymer.

A further aspect provides a method of preparing the ion conductive block copolymer that may secure a chemical stability based on a phenylene structure and that may enhance mechanical properties and long term stability by increasing a molecular weight.

However, the problems to be solved in the present disclosure are not limited to the foregoing problems, and other problems not mentioned herein would be clearly understood by one of ordinary skill in the art from the following description.

According to an aspect, there is provided a block copolymer including a hydrophobic repeating unit represented by Formula 1 below, and a hydrophilic repeating unit represented by Formula 2 below:

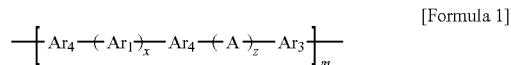 [Formula 1]

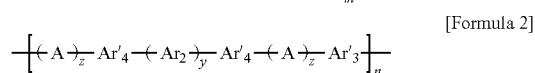 [Formula 2]

wherein $Ar_1$ is an aromatic group including a single benzene ring or at least two benzene rings, the at least two benzene rings are directly connected to each other or are connected to —O—, —S—, —S(O$_2$)—, —(C(O))—, —(CF$_2$)$_n$—, —C(CH$_3$)$_2$—, —C(CF$_3$)$_2$—, an imide bond, an ether imide bond, phosphine, imidazole, or —(CH$_2$)$_n$— in which n is an integer of 1 to 10, each of the benzene rings is unsubstituted or substituted with —COR$_1$ or —CN, and R$_1$ is an aromatic group including at least one benzene ring;

$Ar_2$ is a benzene ring substituted with —COR$_2$ or —(CH$_2$)$_n$CH$_3$ in which n is an integer of 0 to 6, and R$_2$ is an aromatic group including at least one benzene ring that is unsubstituted or substituted with —(CH$_2$)$_n$CH$_3$ in which n is an integer of 0 to 6;

$Ar_3$ and $Ar'_3$ are each independently an aromatic group including a single benzene ring or at least two benzene rings, the at least two benzene rings are directly connected to each other or are connected to —O—, —S—, —S(O$_2$)—, —(C(O))—, —C(CH$_3$)$_2$—, —(CH$_2$)$_n$—, —C(CF$_3$)$_2$—, or —(CF$_2$)$_n$— in which n is an integer of 1 to 10, and each of the benzene rings is unsubstituted or substituted with a halogen ion, hydroxy, acetylene, or —(CH$_2$)$_n$CH$_3$ in which n is an integer of 0 to 6;

$Ar_4$ and $Ar'_4$ are the same as or different from $Ar_1$ and $Ar_2$, and are

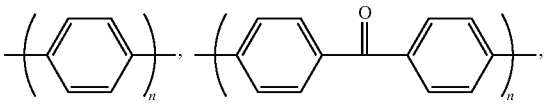

-continued

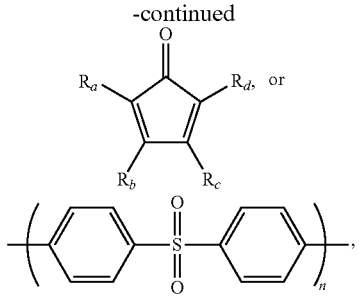

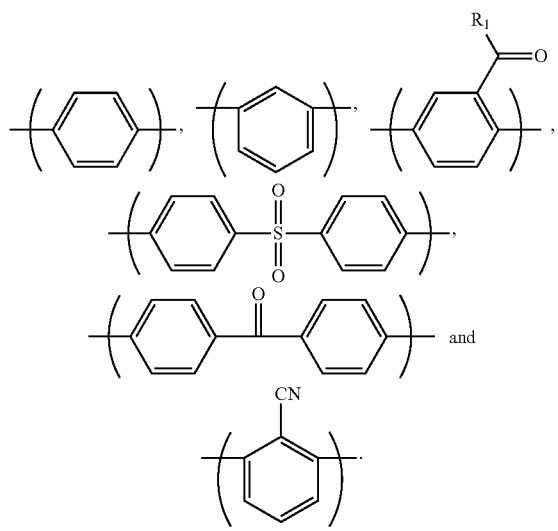

wherein n is an integer of 1 or 2, at least one of $R_a$ through $R_d$ is connected to a main chain of a polymer, and the rest are the same as or different from each other and are hydrogen, benzene or alkyl;

A is —O—, —S—, or —S(O$_2$)—; z is an integer of 0 or 1; and x and y are each independently an integer of 1 to 100.

$Ar_1$ may be selected from the following formulae:

$Ar_1$ may be selected from the following formulae:

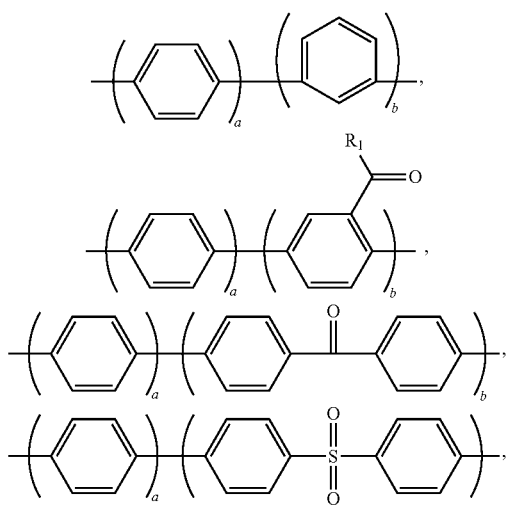

-continued

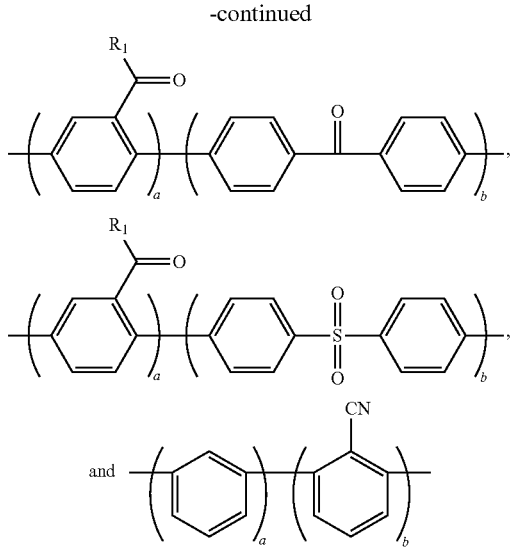

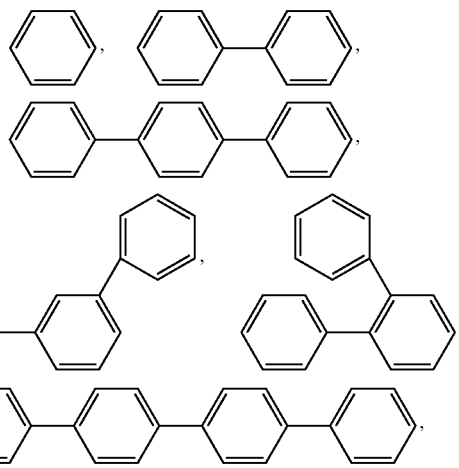

wherein, a and b are each independently an integer of 1 to 100.

$R_1$ may be selected from the following formulae:

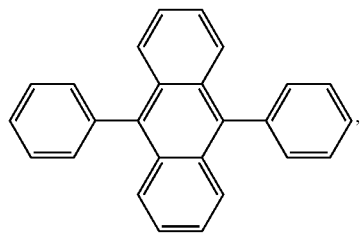

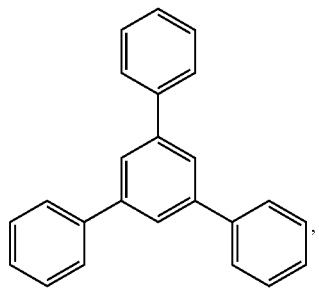

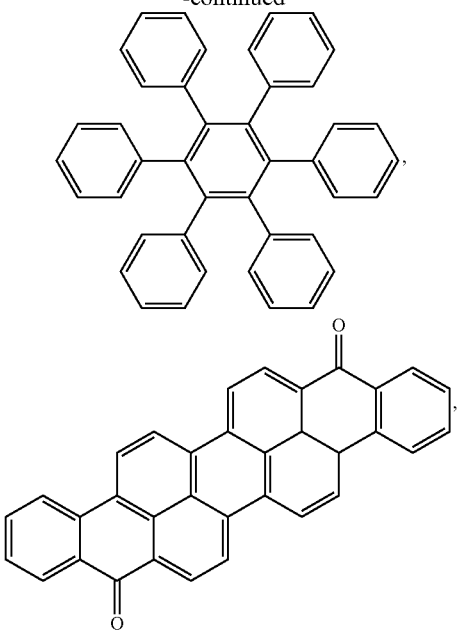
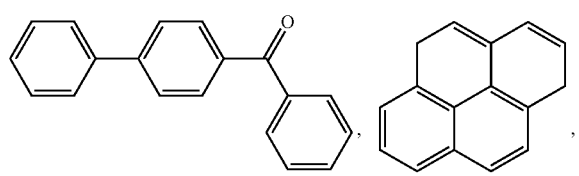
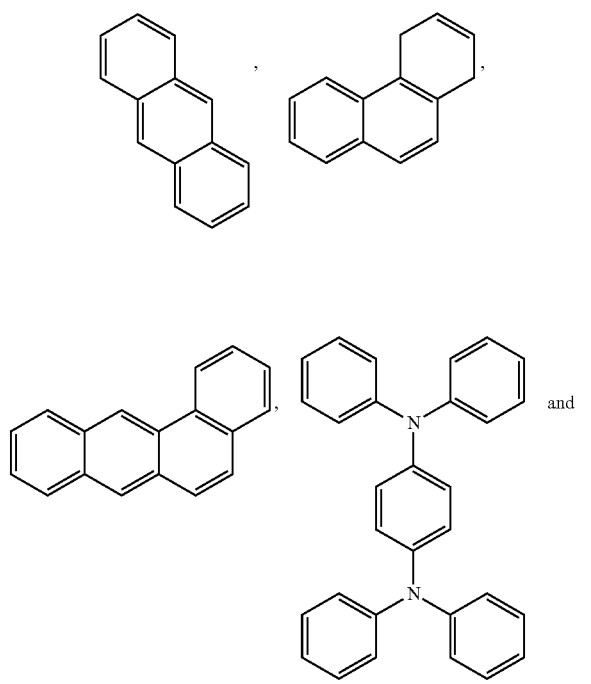
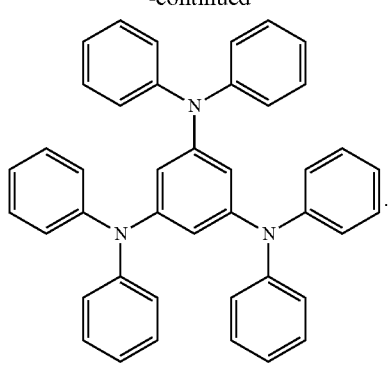
Ar$_2$ may be selected from the following formulae:
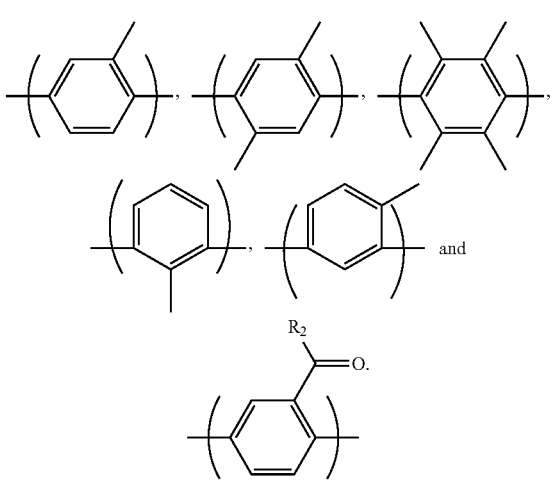
Ar$_2$ may be selected from the following formulae:
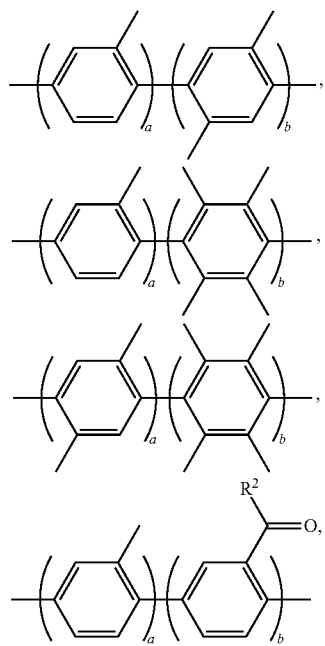

-continued
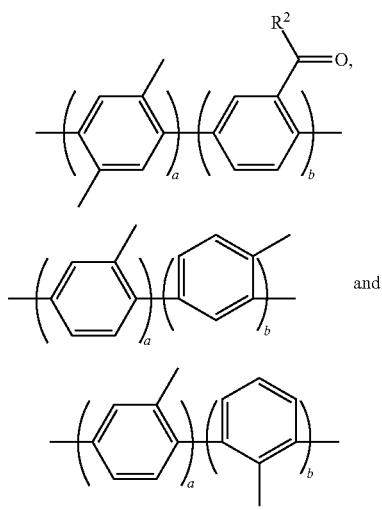
wherein a and b are each independently an integer of 1 to 100.
R₂ may be selected from the following formulae:
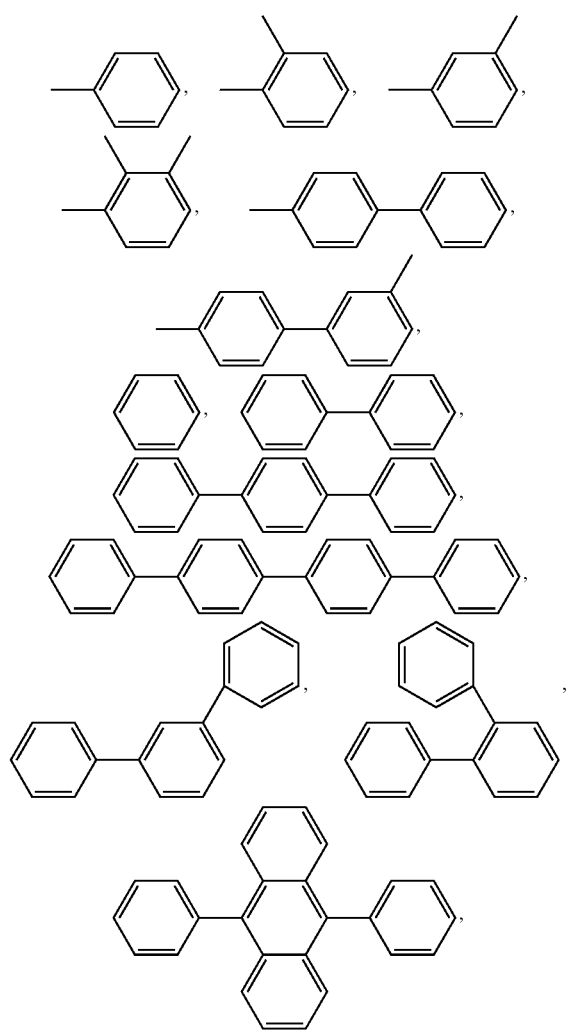
-continued
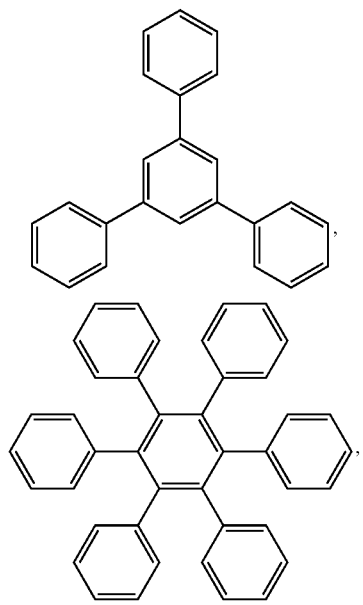
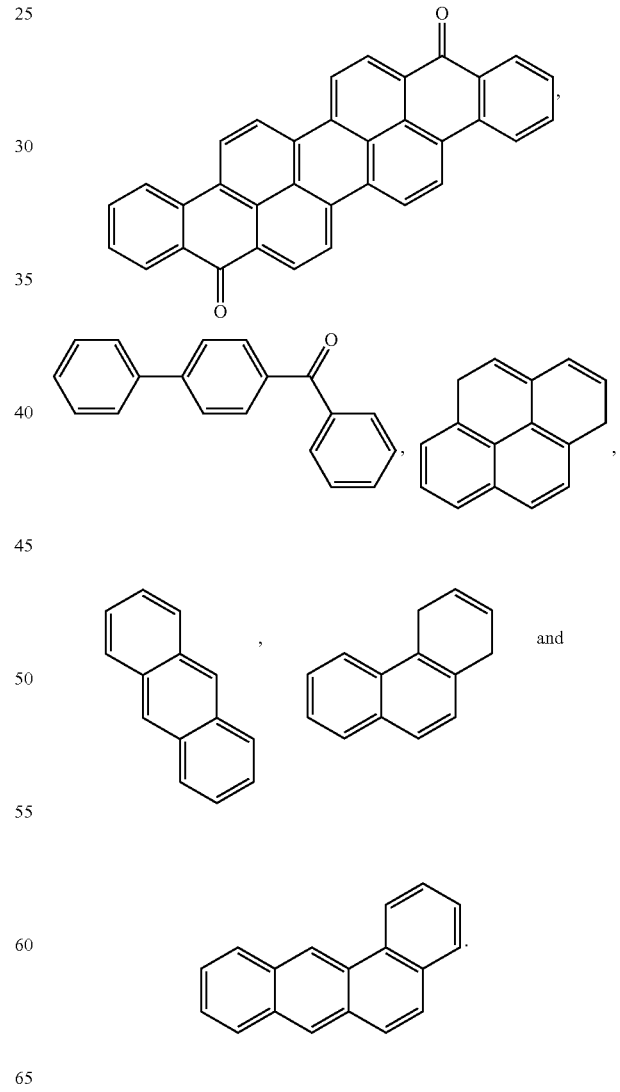
Ar₃ and Ar′₃ may be selected from Formulae 3a through 3d below:

[Formula 3a]

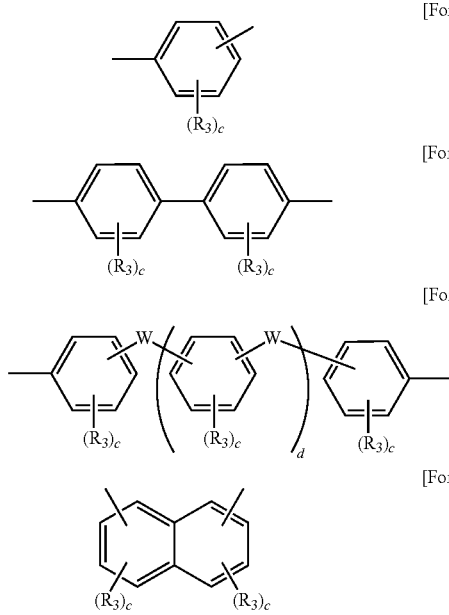

[Formula 3b]

[Formula 3c]

[Formula 3d]

wherein $R_3$ is fluorine (F), chlorine (Cl), hydroxy, acetylene, —$(CH_2)_n$ or —$(CH_2)_nCH_3$ in which n is an integer of 0 to 6, W is —O—, —S—, —$S(O_2)$—, —$C(O)$—, —$C(CH_3)_2$—, —$(CH_2)_n$—, —$C(CF_3)_2$—, or —$(CF_2)_n$— in which n is an integer of 1 to 10, c is an integer of 0 to 4, and d is an integer of 0 to 100.

$Ar_3$ and $Ar'_3$ may be selected from the following formulae:

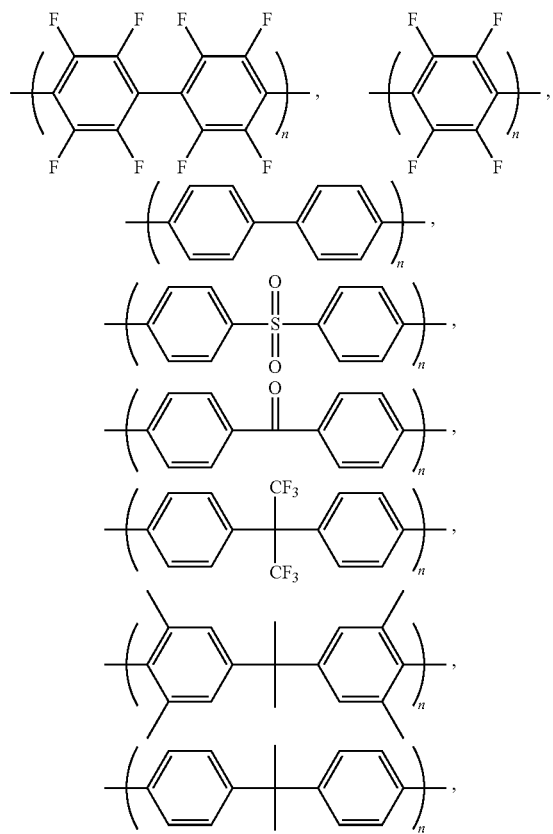

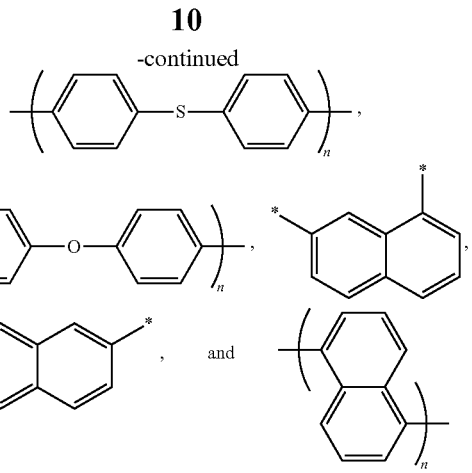

wherein n is an integer of 1 or 2.

A repeating unit represented by Formula 1 may be present in an amount of 50% by moles (mol %) to 95 mol %, and a repeating unit represented by Formula 2 may be present in an amount of 5 mol % to 50 mol %, based on a total mole number of repeating units included in a polymer chain of the block copolymer.

According to another aspect, there is provided an ion conductive block copolymer including a hydrophobic repeating unit represented by Formula 1 below, and a hydrophilic repeating unit represented by Formula 3 below:

$$\left[ Ar_4 \!-\!\!\left( Ar_1 \right)_{\!x}\!\!-\!Ar_4\!-\!\!\left( A \right)_{\!z}\!\!-\!Ar_3 \right]_m \quad \text{[Formula 1]}$$

$$\left[ \left( A \right)_{\!z}\!\!-\!Ar'_4\!-\!\!\left( Ar'_2 \right)_{\!y}\!\!-\!Ar'_4\!-\!\!\left( A \right)_{\!z}\!\!-\!Ar'_3 \right]_n \quad \text{[Formula 3]}$$

wherein $Ar_1$ is an aromatic group including a single benzene ring or at least two benzene rings, the at least two benzene rings are directly connected to each other or are connected to —O—, —S—, —$S(O_2)$—, —$C(O)$—, imide, ether imide, imidazole, phosphine or —$(CH_2)_n$— in which n is an integer of 1 to 10, each of the benzene rings is unsubstituted or substituted with —$COR_1$ or —CN, and $R_1$ is an aromatic group including at least one benzene ring;

$Ar'_2$ is an aromatic group including a single benzene ring or at least two benzene rings substituted with —$COR_4$, $R_4$ or both, and $R_4$ is selected from high-density functional groups FG represented by:

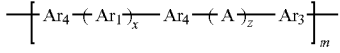

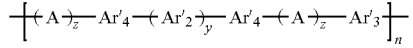

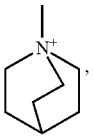 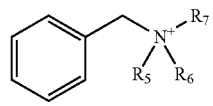 and

-continued

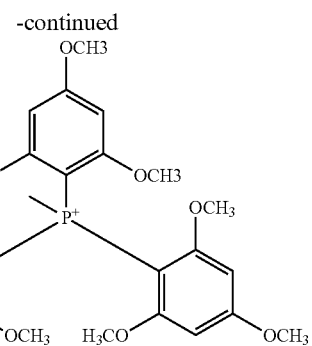

 [Formula 4]

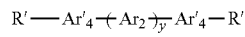 [Formula 5]

 [Formula 7]

wherein M is alkali metal, X is a negative ion of OH⁻, and n is a rational number of 1 to 20, and $R_5$ through $R_7$ are the same as or different from each other and are $C_1$ to $C_6$ alkyl, cyclohexane or benzyl; $Ar_3$ and $Ar'_3$ are the same as or different from each other and are each independently an aromatic group including a single benzene ring or at least two benzene rings, the at least two benzene rings are directly connected to each other or are connected to —O—, —S—, —S($O_2$)—, —(C(O))—, —C($CH_3$)$_2$—, —($CH_2$)$_n$—, —C($CF_3$)$_2$—, or —($CF_2$)$_n$— in which n is an integer of 1 to 10, and each of the benzene rings is unsubstituted or substituted with a halogen ion, hydroxy, acetylene, or —($CH_2$)$_n$$CH_3$ in which n is an integer of 0 to 6;

$Ar_4$ and $Ar'_4$ are the same as or different from each other, and are

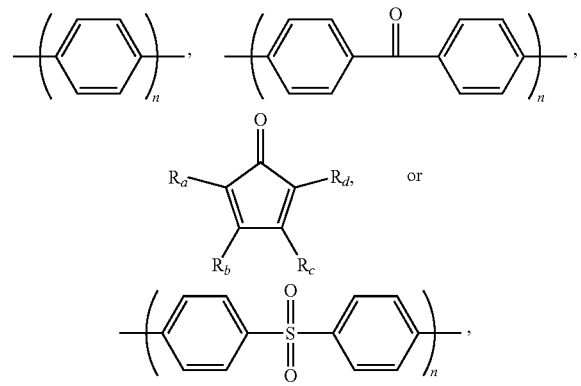

wherein n is an integer of 1 or 2, and at least one of $R_a$ through $R_d$ is connected to a main chain of a polymer and the rest are the same as or different from each other and are hydrogen, benzene or alkyl;

A is -0-, —S—, or —S($O_2$)—; z is an integer of 0 or 1; and x and y are each independently an integer of 1 to 100.

According to still another aspect, there is provided a polymer electrolyte including the ion conductive block copolymer as an active component.

According to yet another aspect, there is provided an ion-exchange membrane including the polymer electrolyte.

According to a further aspect, there is provided an ionomer binder including the block copolymer.

According to a further aspect, there is provided a fuel cell including a cathode layer, an anode layer, and the ion-exchange membrane of claim disposed between the cathode layer and the anode layer.

Either the cathode layer or the anode layer or both may further include the ionomer binder According to a further aspect, there is provided a method of preparing a block copolymer, including performing polymerization by adding a hydrophobic oligomer represented by Formula 4 below, a hydrophilic oligomer represented by Formula 5 below, and a chain extender, to prepare a block copolymer represented by Formula 7 below.

wherein R and R' are each independently a hydroxyl group (OH), fluorine (F), chlorine (Cl), bromine (Br), or iodine (I), and each abbreviation in Formula 7 is the same as defined above.

The chain extender may include at least one compound represented by Formulae 6a through 6d below.

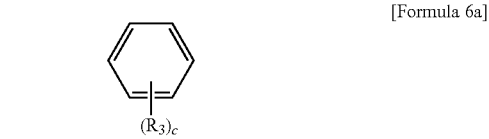 [Formula 6a]

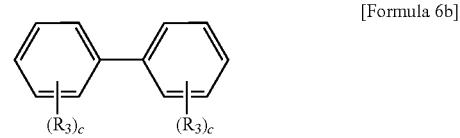 [Formula 6b]

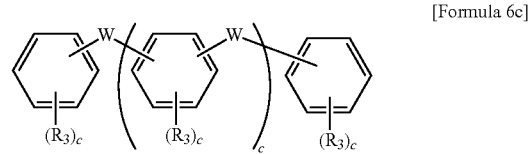 [Formula 6c]

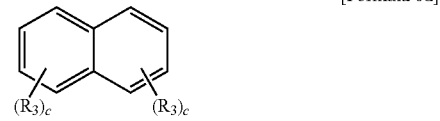 [Formula 6d]

wherein $R_3$ is F, Cl, OH, acetylene, —($CH_2$)$_n$ or —($CH_2$)$_n$$CH_3$ in which n is an integer of 0 to 10, W is -O-, —S—, —S($O_2$)—, —(C(O))—, —C($CH_3$)$_2$—, —($CH_2$)$_n$—, —C($CF_3$)$_2$—, or —($CF_2$)$_n$— in which n is an integer of 1 to 10, c is an integer of 0 to 4, and d is an integer of 0 to 100.

The hydrophobic oligomer represented by Formula 4 and the hydrophilic oligomer represented by Formula 5 may have a polydispersity (PD) less than or equal to 3.

According to a further aspect, there is provided a method of preparing the ion conductive block copolymer, including performing polymerization by adding a hydrophobic oligomer represented by Formula 4 below, a hydrophilic oligomer represented by Formula 5 below, and a chain extender, to prepare a block copolymer represented by Formula 7 below, and substituting a benzene ring of $Ar_2$ in the block copolymer represented by Formula 7 with a high-density functional group FG, to prepare an ion conductive copolymer represented by Formula 8 below:

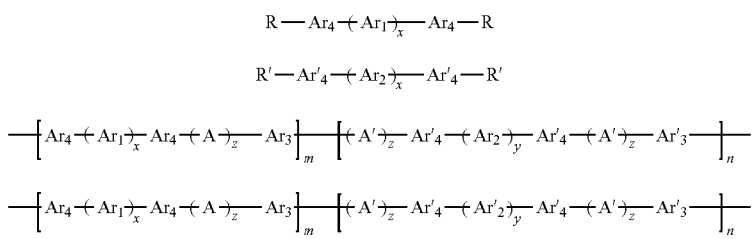

[Formula 4]

[Formula 5]

[Formula 7]

[Formula 8]

wherein R and R' are each independently OH, F, Cl, Br, I, or

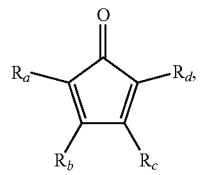

each abbreviation in Formula 7 is the same as defined above and each abbreviation in Formula 8 is the same as defined above.

Additional aspects of example embodiments will be set forth in part in the description which follows and, in part, will be apparent from the description, or may be learned by practice of the disclosure.

DETAILED DESCRIPTION

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments and thus may be changed depending on a user, the intent of an operator, or a custom of a field to which the present disclosure pertains. Accordingly, the terms must be defined based on the following overall description of this specification. Like reference numerals present in the drawings refer to the like elements throughout.

According to an example embodiment, a block copolymer may be provided. The block copolymer may include, for example, a polyphenylene block copolymer having a high molecular weight and an enhanced solubility and enhanced mechanical properties due to an introduction of a polymer chain extension ring.

The block copolymer may have a structure in which hydrophobic block units and hydrophilic block units are alternately connected, and may enhance a performance due to a hydrophilic-hydrophobic phase separation and enhance a chemical stability by excluding ether linkages.

For example, a hydrophobic block unit may include a hydrophobic repeating unit represented by Formula 1 below, and a hydrophilic block unit may include a hydrophilic repeating unit represented by Formula 2 below.

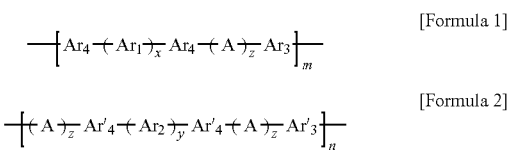

[Formula 1]

[Formula 2]

$Ar_1$ may be an aromatic group including a single benzene ring or at least two benzene rings. The at least two benzene rings may be directly connected to each other, or may be connected to -O-, —S—, —S($O_2$)—, —C(O)—, —($CF_2$)$_n$—, —C($CH_3$)$_2$—, —C($CF_3$)$_2$—, an imide bond, an ether imide bond, phosphine, imidazole, or —($CH_2$)$_n$— in which n is an integer of 1 to 10. Each of the benzene rings may be unsubstituted or substituted with —$COR_1$ or —CN, and $R_1$ may be an aromatic group including at least one benzene ring.

For example, $Ar_1$ may include at least one selected from the following formulae:

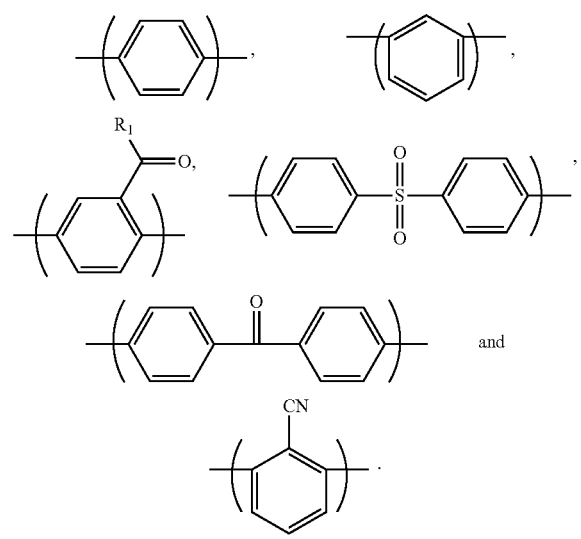

For example, $Ar_1$ may be selected from the following formulae:

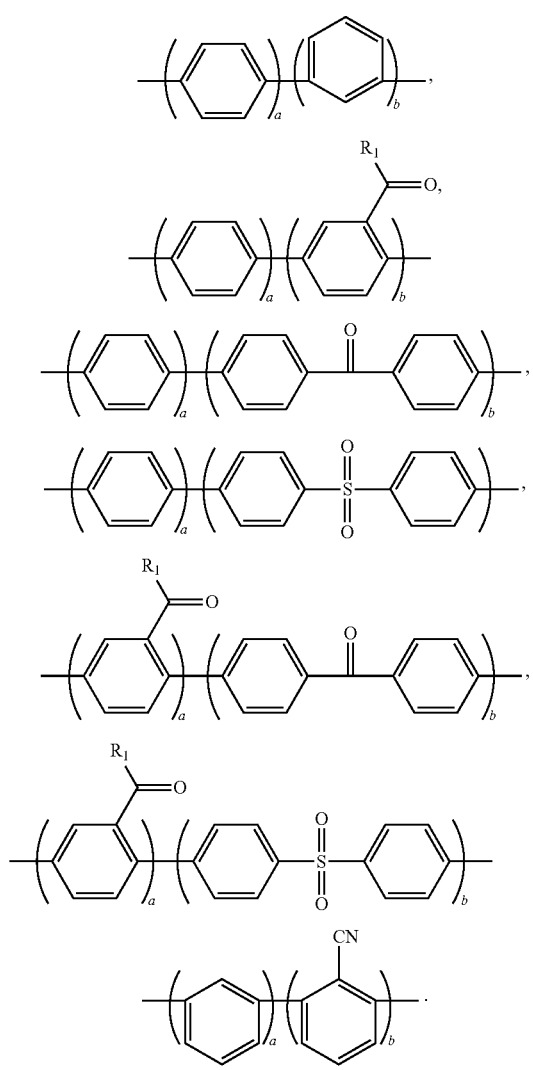
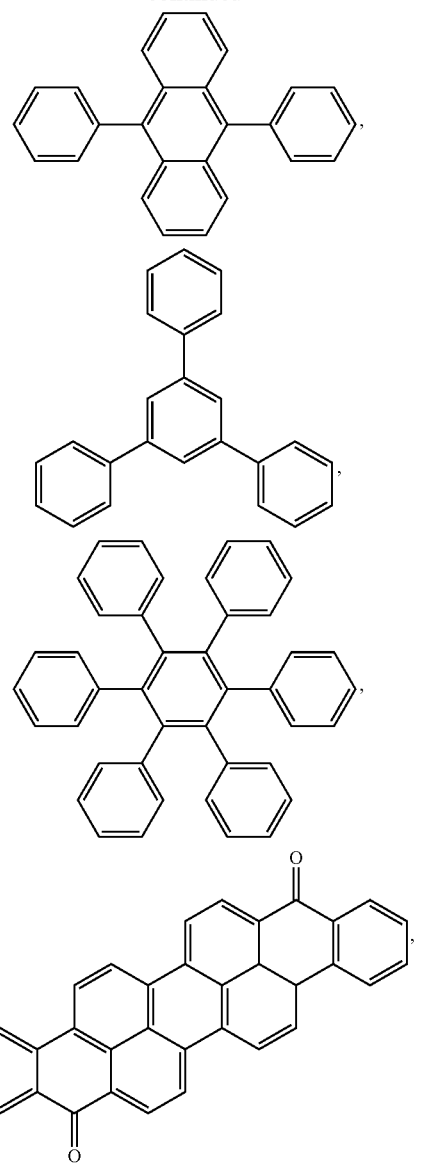
Also, R₁ may be selected from the following formulae:
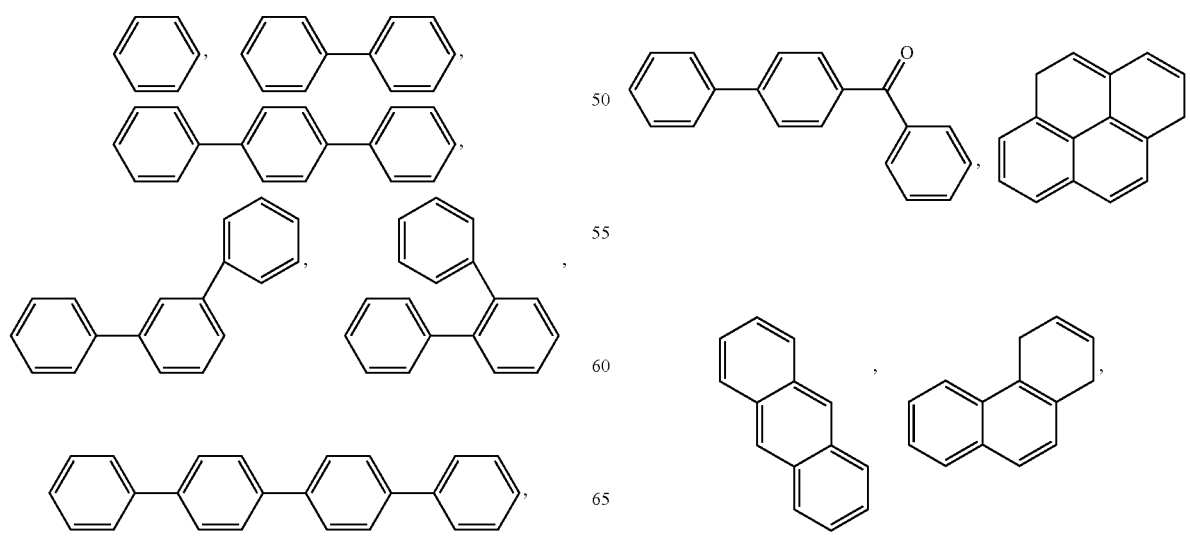

-continued

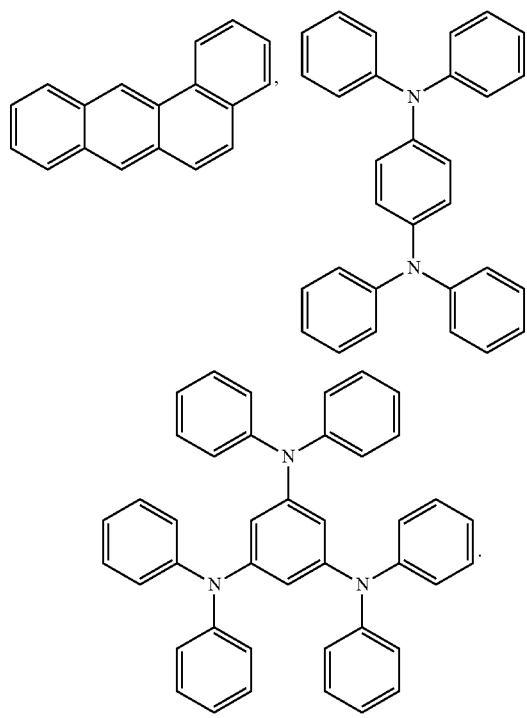

Ar$_2$ may be a benzene ring substituted with —COR$_2$ or —(CH$_2$)$_n$CH$_3$ in which n is an integer of 0 to 6, and R$_2$ may be an aromatic group including at least one benzene ring that is unsubstituted or substituted with —(CH$_2$)$_n$CH$_3$ in which n is an integer of 0 to 6.

For example, Ar$_2$ may include at least one selected from the following formulae:

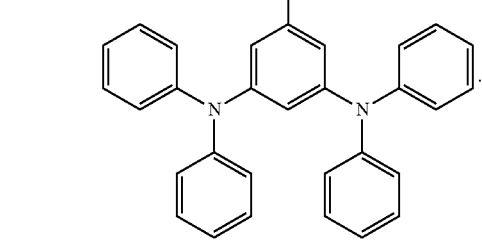

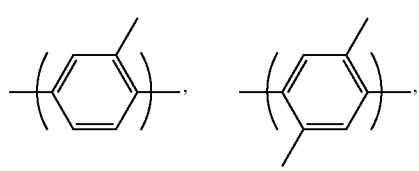

For example, Ar$_2$ may be selected from the following formulae:

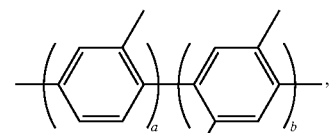

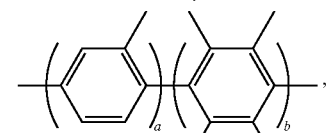

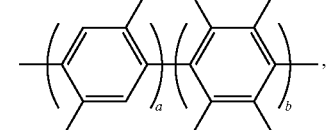

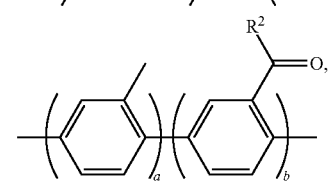

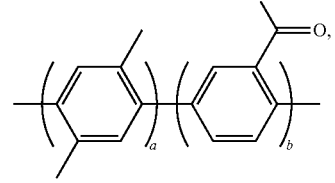

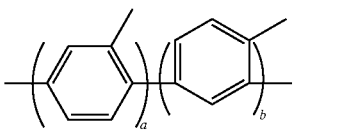

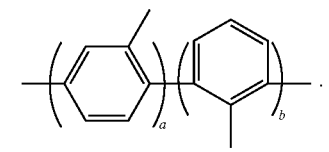

In the above formulae, a and b may each independently be an integer of 1 to 100.

For example, R$_2$ may be selected from the following formulae:

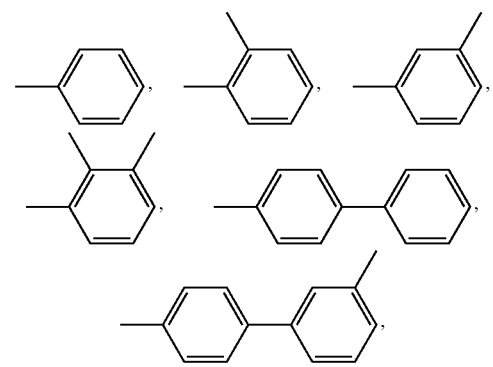

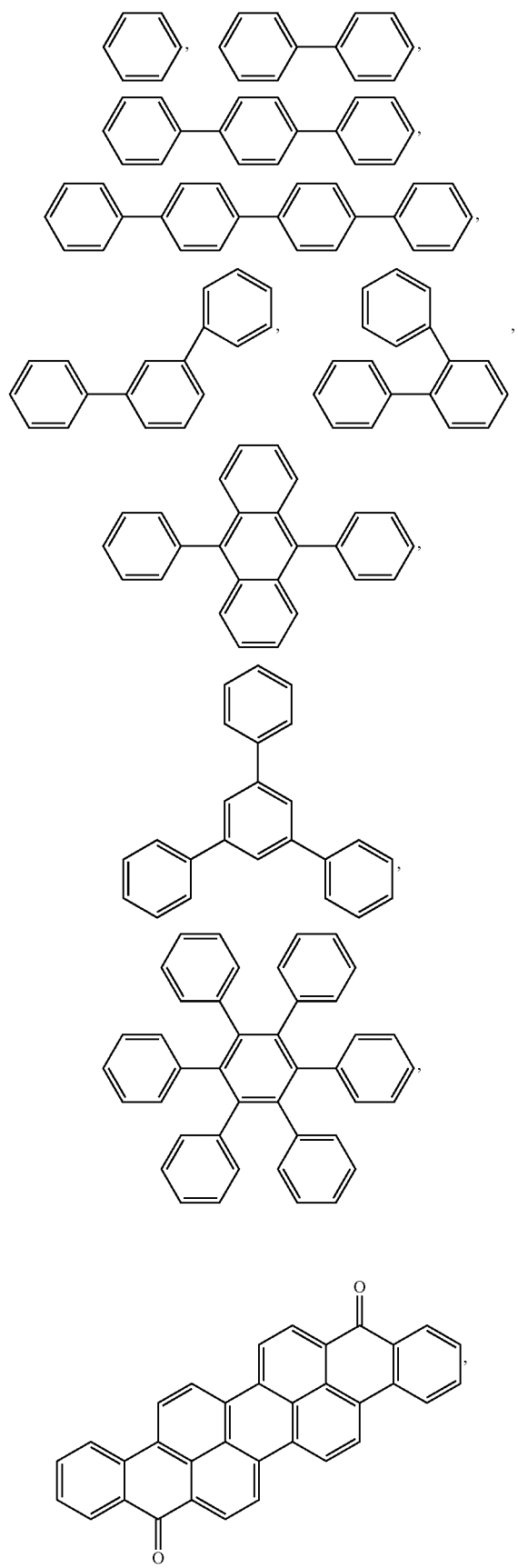

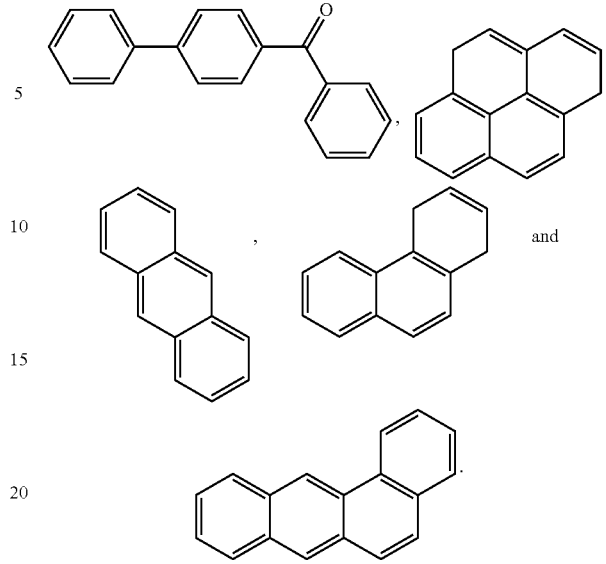

Ar₃ and Ar'₃ may represent polymer chain extension rings, and may each independently be an aromatic group including a single benzene ring or at least two benzene rings. The at least two benzene rings may be directly connected to each other, or may be connected to -O-, —S—, —S(O₂)—, —(C(O))—, —C(CH₃)₂—, —(CH₂)ₙ—, —C(CF₃)₂—, or —(CF₂)ₙ— in which n is an integer of 1 to 10. Each of the benzene rings may be unsubstituted or substituted with a halogen ion, hydroxy or —(CH₂)ₙCH₃ in which n is an integer of 0 to 6.

For example, Ar₃ and Ar'₃ may be selected from Formulae 3a through 3d shown below.

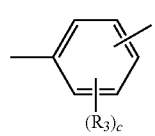

[Formula 3a]

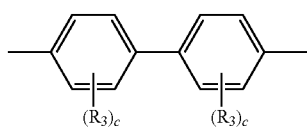

[Formula 3b]

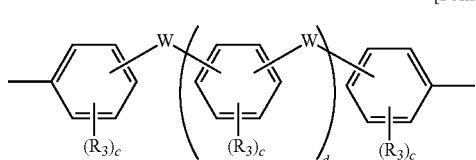

[Formula 3c]

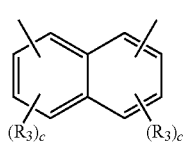

[Formula 3d]

In Formulae 3a through 3d, R₃ may be fluorine (F), chlorine (Cl), hydroxy, acetylene, —(CH₂)ₙ or —(CH₂)ₙCH₃ in which n is an integer of 1 to 10, and W may be -O-, —S—, —S(O₂)—, —(C(O))—, —C(CH₃)₂—, —$(CH_2)_n$—, —$C(CF_3)_2$—, or —$(CF_2)_n$— in which n is an integer of 1 to 10. Also, c may be an integer of 0 to 4 and d may be an integer of 0 to 100.

Desirably, $Ar_3$ and $Ar'_3$ may be selected from the following formulae:

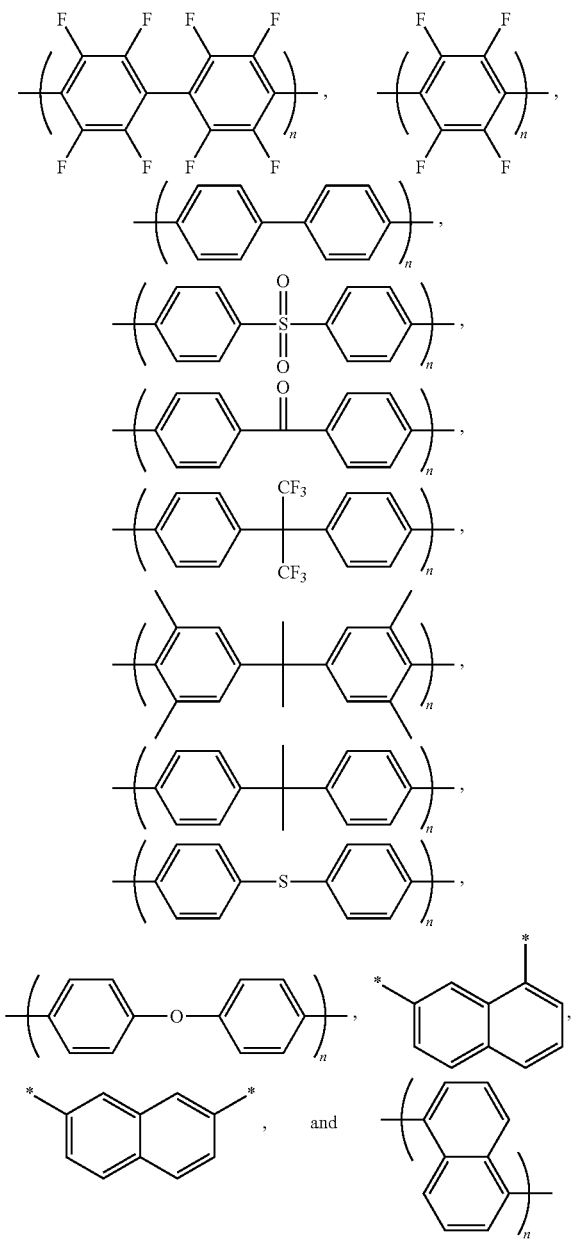

In the above formulae, n may be an integer of 1 or 2.

$Ar_4$ and $Ar'_4$ may be the same as or different from each other, and may be the same as or different from $Ar_1$ and $Ar_2$. Also, $Ar_4$ and $Ar'_4$ may be

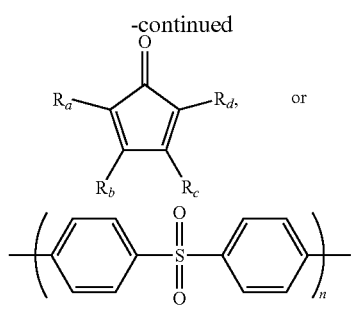

in which n may be an integer of 1 or 2, and at least one of $R_a$ through $R_d$ may be connected to a main chain of a polymer and the rest may be the same as or different from each other and may be hydrogen, benzene or alkyl. The alkyl may be $C_1$ to $C_5$ alkyl.

For example, A may be -O-, —S—, or —$S(O_2)$—, and desirably be -O- or S—. Also, z may be an integer of 0 or 1, and x and y may each independently be an integer of 1 to 100.

For example, m and n may be the same as or different from each other, and may each independently be an integer of 1 to 1,000.

For example, a repeating unit represented by Formula 1 may be present in an amount of 50% by moles (mol %) to 95 mol %, and a repeating unit represented by Formula 2 may be present in an amount of 5 mol % to 50 mol %, based on a total mole number of repeating units included in a polymer chain of the block copolymer. When the amounts of the repeating units are within the above ranges, an electrochemical characteristic may be excellent due to an excellent hydrophilic-hydrophobic phase separation based on a characteristic of the block copolymer.

According to an example embodiment, an ion conductive block copolymer may be provided. The block copolymer may include, for example, an ion conductive polyphenylene block copolymer. The ion conductive polyphenylene block copolymer may have a high ionic conductivity due to an increase in a density of an ion-exchange functional group in a hydrophilic block, and may have an enhanced solubility and enhanced mechanical properties due to an introduction of a polymer chain extension ring.

The ion conductive block copolymer may have a structure in which a hydrophobic block unit and a hydrophilic block unit in which an ion-exchange functional group is introduced are alternately connected, and may be excellent in a performance in a low humidity condition and excellent in a chemical due to a hydrophilic-hydrophobic phase separation.

The hydrophobic block unit may include a hydrophobic repeating unit represented by Formula 1 below, and the hydrophilic block unit may include a hydrophilic repeating unit represented by Formula 3 below.

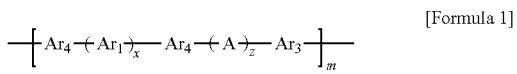
[Formula 1]

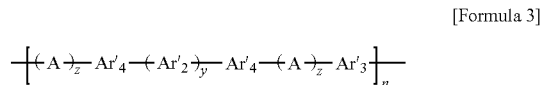
[Formula 3]

$Ar_1$ may be the same as that described above.

Ar'$_2$ may be an aromatic group including a single benzene ring or at least two benzene rings substituted with —COR$_4$, R$_4$ or both, and R$_4$ may be selected from high-density functional groups FG that function as ion transfer functional groups and that are represented by the following formulae:

—SO$_3$H,  —SO$_3^-$M$^+$,  —(CH$_2$)$_n$SO$_3$H,  —(CF$_2$)$_n$SO$_3$H,

—(CF$_2$)$_n$SO$_3^-$M$^+$,  —(CF$_2$)$_n$PO$_3$H$_2$,  —N$^+$(CH$_3$)$_3$X$^-$,

—(CH$_2$)$_n$N$^+$(CH$_3$)$_3$X$^-$,

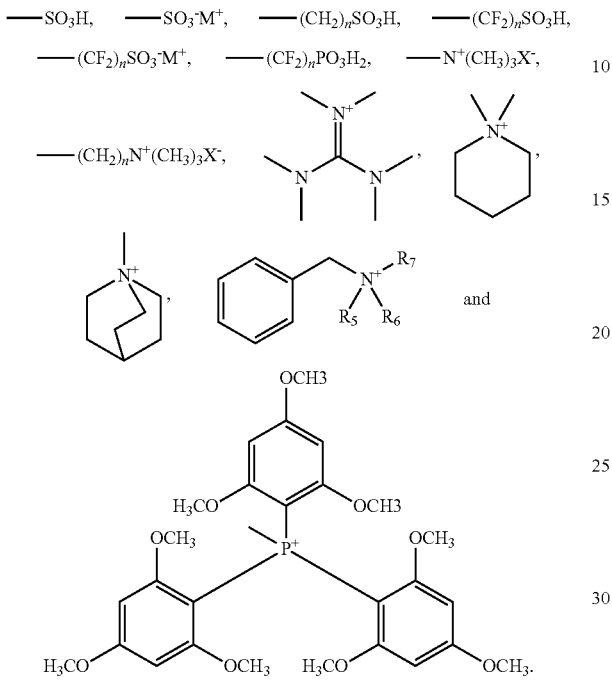

In the above formulae, M may be alkali metal, X may be a negative ion of OH$^-$, desirably Li, Na, K or OH, and the like, and n may be a rational number of 1 to 20. Also, R$_5$ through R$_7$ may be the same as or different from each other, and may be C$_1$ to C$_6$ alkyl, cyclohexane or benzyl.

For example, Ar'$_2$ may include at least one selected from the following formulae:

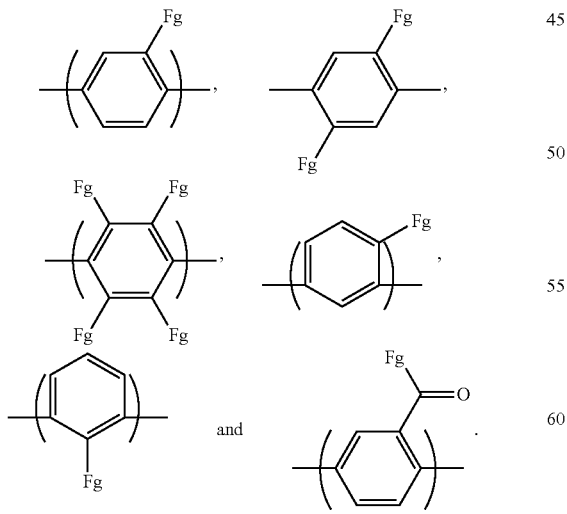

For example, Ar'$_2$ may include at least one selected from the following formulae:

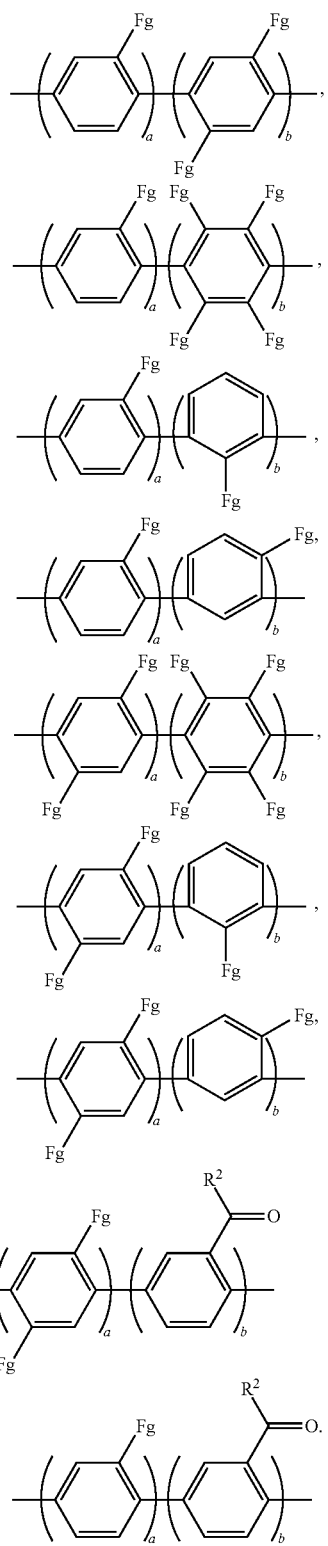

In the above formulae, a and b may each independently be an integer of 1 to 100.

Ar$_3$, Ar'$_3$, Ar$_4$ and Ar'$_4$ may be the same as those described above, and A may be oxygen or sulfur. Also, z may be an integer of 0 or 1, and x and y may each independently be an integer of 1 to 100.

For example, a repeating unit represented by Formula 1 may be present in an amount of 50 mol % to 95 mol %, and a repeating unit represented by Formula 2 may be present in an amount of 5 mol % to 50 mol %, based on a total mole number of repeating units included in a polymer chain of the ion conductive block copolymer. When the amounts of the repeating units are within the above ranges, a chemical stability may be excellent due to a hydrophilic-hydrophobic phase separation based on a characteristic of a block copolymer.

According to an example embodiment, a polymer electrolyte including the ion conductive block copolymer may be provided.

The polymer electrolyte may include the ion conductive block copolymer as an active component, and may be excellent in an electrochemical characteristic by applying a polyphenylene block copolymer in which a density of an ion exchange functional group increases.

For example, the ion conductive block copolymer may be present in an amount less than or equal to 100% by weight (wt %), an amount that exceeds 0 wt % and that is less than or equal to 100 wt %, an amount of 90 wt % to 95 wt %, or an amount of 50 wt % to 80 wt %, based on a total weight of the polymer electrolyte.

The polymer electrolyte may have a weight-average molecular weight of 3,000 grams per mole (g/mol) to 1,000,000 g/mol. When the weight-average molecular weight of the polymer electrolyte is within the above range, excellent mechanical properties and long term stability may be secured.

The polymer electrolyte may have an ion exchange capacity (IEC) of 0.5 millimoles per gram (mmol/g) to 3.0 mmol/g. When the IEC of the polymer electrolyte is within the above range, an excellent mechanical strength and an excellent electrochemical characteristic may be secured.

The polymer electrolyte may further include an electrolyte applicable to the polymer electrolyte in addition to the ion conductive block copolymer, at an appropriate ratio, without departing from aspects of the present disclosure. Examples of the polymer electrolyte may include, but are not limited to, at least one of a sulfonated hydrocarbon-based polymer; a perfluorosulfonic acid polymer such as Nafion manufactured by Du Pont Corp., Flemion manufactured by Asahi Glass Co., Ltd., Asiplex manufactured by Asahi Chemical Industry Co., Ltd., Dow XUS manufactured by Dow Chemical Co., and Aquivion manufactured by Solvay Specialty Polymers; a benzimidazole-based polymer, a polyimide-based polymer; a polyetherimide-based polymer; a polyetherketone-based polymer, a polyether-etherketone-based polymer and a polyphenylquinoxaline-based polymer.

According to an example embodiment, an ion-exchange membrane including the polymer electrolyte may be provided. The polymer electrolyte including the ion conductive block copolymer may be applied, and thus it is possible to easily prepare an ion-exchange membrane, possible to provide a membrane with stable mechanical properties, and possible to provide a membrane that has an excellent performance with a high ionic conductivity in a low humidity due to an increase in a density of an ion-exchange functional group.

The ion-exchange membrane may include a supporter, and the polymer electrolyte. The polymer electrolyte may be impregnated in the supporter or may be formed in one side or both sides of the supporter.

The supporter may be, for example, a porous supporter or a solid supporter including a glass plate, a metal or ceramic.

The polymer electrolyte may be impregnated in the porous supporter. When the porous supporter is applicable to the ion-exchange membrane, the porous supporter may be used without a limitation. Examples of the porous supporter may include, but are not limited to, at least one of polytetrafluoroethylene (PTFE), polyethylene (PE), polyvinylidene fluoride (PVDF), polyimide (PI), polypropylene (PP), cellulose and nylon.

For example, to enhance ion diffusion and performance of an electrolyte membrane, the ion-exchange membrane may further include an additive that includes an organic material, (for example, a radical quencher), an inorganic material or an organic-inorganic composite. Examples of the additive may include, but are not limited to, at least one of a transition metal salt such as a cerium(III) salt; an organic compound such as 2,2'-bipyridine, hydroquinone, pyrazine-2,3-carboxylic acid, pyrazine-2,3-dicarboxylic acid, 2(-naphthalene-2-yl)-1-(naphthalene-7-yl)hydrazine, and 4-(3-(pyridine-4-yl)propyl)pyridine; cerium(III) trifluoromethanesulfonate; cerium(III) trifluoroacetylacetonate; and cerium (III), tris(5-oxo-L-prolinato-N1,O2)-(9CI).

For example, the polymer electrolyte may be dissolved in an organic solvent to be in the form of a solution, a gel or a suspension. In this example, the polymer electrolyte may be applied to the supporter or may be impregnated in the supporter, to form the ion-exchange membrane.

The ion-exchange membrane may be, for example, a flat membrane, a composite membrane or a tube membrane.

According to an example embodiment, an ionomer binder including the block copolymer may be provided. The ionomer binder may induce a stable connection of a membrane-electrode assembly and may enhance an electrochemical performance.

The ionomer binder may include a solvent and the block copolymer, and may further include a binder that is applicable in the present disclosure.

The block copolymer may be present in an amount of 1% by weight (wt %) to 40 wt % in the ionomer binder. The solvent may be an organic solvent, for example, acetonitrile, and the like.

According to an example embodiment, a fuel cell including the block copolymer, the ion conductive block copolymer or both may be provided. The fuel cell may have an enhanced performance and enhanced mechanical and electrochemical stability.

The fuel cell may include a cathode layer, an anode layer, and/or the ion-exchange membrane disposed between the cathode layer and the anode layer. The cathode layer and/or the anode layer may include the ionomer binder.

The cathode layer (for example, an oxygen electrode layer) may correspond to an electrode to reduce oxygen, and may include a catalyst layer including a supporter on which a catalytic metal is supported. The catalytic metal may include, for example, at least one of Al, Si, Ti, V, Cr, Mn, Co, Ni, Cu, Zn, Ga, Se, Rh, Pd, Ag, Cd, In, Sn, W, Os, Ir, Pt, Au, Hg, Pb, Ru and Bi.

The catalytic metal may have a diameter of 1 nanometers (nm) to 10 nm. When the diameter of the catalytic metal is within the above range, an oxygen reduction reaction in which hydrogen cations, oxygen and electrons react to generate water may be activated, and deactivation due to dissolution and coagulation of active metals may be mitigated. Also, a reactant and reaction product for electricity generation, for example, oxygen diffusion and water flooding in a cathode layer may be mitigated, so that water may be smoothly managed.

For example, the supporter may include a carbon material. The carbon material may include, for example, at least one of graphite, a carbon black, carbon power, a carbon nanotube, a carbon nanofiber and a carbon nanorod. The carbon material may have a diameter of 5 nm to 100 nm or a length of 0.1 micrometers (μm) to 10 μm. When the diameter or the length of the carbon material is within the above range, a durability may be enhanced due to a high physical strength, and a participation of a catalyst in a reaction may increase by increasing a porosity and/or a size of a pore of the cathode layer.

For example, the cathode layer may further include an ionomer binder. The ionomer binder may be the same as that described above. To form the cathode layer, a catalyst slurry may be prepared by mixing a catalytic metal, a solvent and the ionomer binder, and a supporter may be coated with the catalyst slurry.

For example, the anode layer may be applicable in a technical field of the present disclosure, without departing from the scope of the present disclosure. Examples of the anode layer may include, but are not limited to, at least one of a metal catalyst such as Pt, Ru and Pd and an alloy thereof; a carbon material on which the metal catalyst is supported; a metal sulfide of a sulfur/graphite mixture; a metal phosphide of a phosphorus/graphite mixture; a carbon-based material such as graphite, natural graphite, artificial graphite, soft carbon and hard; and a metal-carbon composite of a Sb/C composite and SnSb/C composite. Also, the anode layer may further include an ionomer binder. The ionomer binder may be the same as that described above.

According to an example embodiment, a method of preparing the block copolymer may be provided. A multi-block copolymer may be synthesized by introducing a monomer and/or an oligomer in which a chain extension ring is introduced. Thus, it is possible to enhance mechanical properties and solubility by synthesizing a block copolymer with a high molecular weight.

The method may include preparing a hydrophobic oligomer and a hydrophilic oligomer and preparing a block copolymer.

For example, in the preparing of the hydrophobic oligomer and the hydrophilic oligomer, a hydrophobic oligomer represented by Formula 4 and a hydrophilic oligomer represented by Formula 5 may be prepared.

Each of the hydrophobic oligomer and the hydrophilic oligomer may have a polydispersity less than or equal to 3, less than or equal to 2, or less than or equal to 1.5. When the polydispersity is within the above range, an arrangement regularity of the block copolymer may be enhanced so that properties of the block copolymer may be uniformly adjusted.

In the preparing of the hydrophobic oligomer and the hydrophilic oligomer, a preparing process used in the technical field of the present disclosure may be applicable, and accordingly further description thereof is omitted herein.

[Formula 4]

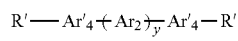
[Formula 5]

In Formulae 4 and 5, R and R' may each independently be OH, F, Cl, Br, or I, and $Ar_1$, $Ar_2$ and $Ar_4$ may be the same as those described above.

In the preparing of the block copolymer, polymerization may be performed by adding the hydrophobic oligomer represented by Formula 4, the hydrophilic oligomer represented by Formula 5 and a chain extender, to prepare a block copolymer represented by Formula 7 below.

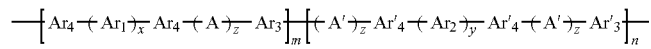
[Formula 7]

In Formula 7, R, R', m, n, z, x, y, A, $Ar_1$, $Ar_2$ and $Ar_4$ may be the same as those described above. Also, $Ar_a$ may be a functional group based on an introduction of the chain extender and may be the same as that described above in the block copolymer.

For example, the chain extender may include at least one compound represented by Formulae 6a through 6d below.

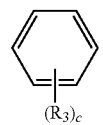
[Formula 6a]

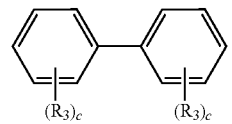
[Formula 6b]

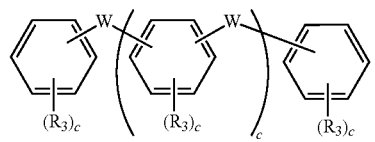
[Formula 6c]

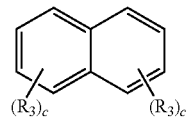
[Formula 6d]

In Formulae 6a through 6d, $R_3$ may be F, Cl, OH, acetylene, $-(CH_2)_n-$ or $-(CH_2)_nCH_3$ in which n is an integer of 0 to 10, and W may be -0-, $-S-$, $-S(O_2)-$, $-(C(O))-$, $-C(CH_3)_2-$, $-(CH_2)_n-$, $-C(CF_3)_2-$, or $-(CF_2)_n-$ in which n is an integer of 1 to 10. Also, c may be an integer of 0 to 4.

According to an example embodiment, a method of preparing the ion conductive block copolymer may be provided. A multi-block copolymer may be synthesized by introducing a monomer and/or an oligomer in which a chain extension ring is introduced. Thus, it is possible to enhance mechanical properties and solubility by synthesizing a block copolymer with a high molecular weight, and possible to provide a high ion conductive block copolymer due to a high partial IEC of a hydrophilic block.

The method may include preparing a hydrophobic oligomer and a hydrophilic oligomer, preparing a block copolymer, and performing substitution with a high-density functional group FG.

For example, in the preparing of the hydrophobic oligomer and the hydrophilic oligomer, a hydrophobic oligomer represented by Formula 4 and a hydrophilic oligomer represented by Formula 5 may be prepared. The hydrophilic oligomer represented by Formula 5 may have a structure in which a concentration (for example, an IEC) of an ion-exchange functional group increases, and accordingly may have an extremely high hydrophilicity. Also, a high ion conductive block copolymer may be provided due to a high partial IEC of a hydrophilic block.

Each of the hydrophobic oligomer and the hydrophilic oligomer may have a polydispersity (PD) less than or equal to 3, less than or equal to 2, or less than or equal to 1.5. When the polydispersity is within the above range, an arrangement regularity of the block copolymer may be enhanced so that properties of the block copolymer may be uniformly adjusted.

In the preparing of the hydrophobic oligomer and the hydrophilic oligomer, a preparing process used in the technical field of the present disclosure may be applicable, and accordingly further description thereof is omitted herein.

[Formula 4]

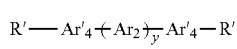

[Formula 5]

In the preparing of the block copolymer, polymerization may be performed by adding the hydrophobic oligomer represented by Formula 4, the hydrophilic oligomer represented by Formula 5 and a chain extender, to prepare a block copolymer represented by Formula 7 below.

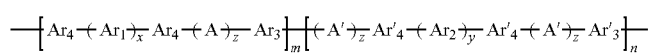

In Formula 7, R, R', m, n, z, x, y, A, $Ar_1$ through $Ar_4$ may be the same as those described above. The chain extender may be the same as that described above.

For example, in the performing of the substitution with the high-density functional group FG, at least one benzene ring of $Ar_2$ in the block copolymer represented by Formula 7 may be substituted with the high-density functional group FG, to prepare an ion conductive block copolymer represented by Formula 8 below.

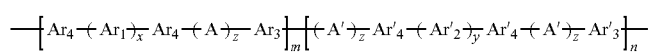

In Formula 8, m, n, z, x, y, and $Ar_1$ through $Ar_4$ may be the same as those described above.

In the performing of the substitution with the high-density functional group FG, a preparing process used in the technical field of the present disclosure may be applicable. For example, after a selective halogenation, for example, a selective bromination of alkyl, may be performed in a substitution position of the high-density functional group FG, the substitution with the high-density functional group FG may be performed, however, there is no limitation thereto.

Hereinafter, the present disclosure will be described with reference to example embodiments, however, is not intended to be limited to the example embodiments. Various modifications and changes may be made in the present disclosure without departing from the spirit and scope of the present disclosure as defined by the appended claims, the detailed description and accompanying drawings.

SYNTHESIS EXAMPLE 1

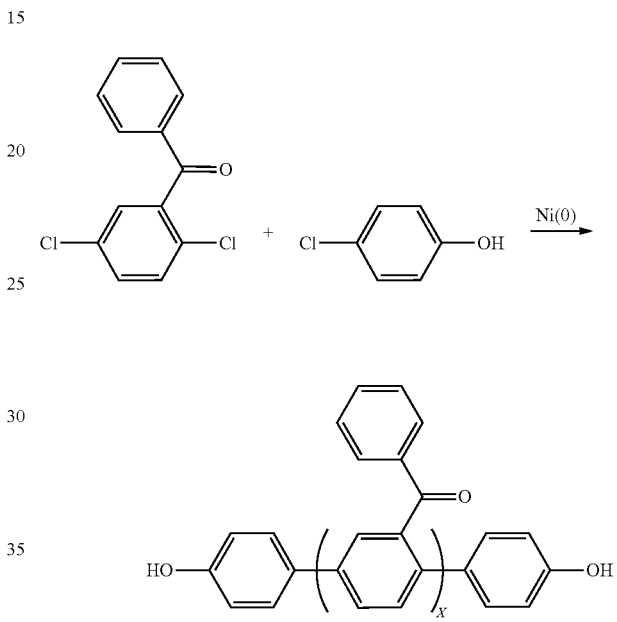

A three-neck flask was connected to a cold mechanical stirrer and purged with nitrogen. 2,5-Dichlorobenzophenone (1.40 mmol, 0.3511 g), 4-chlorophenol (0.11 mmol, 0.0138 g), and bipyridine (3.64 mmol, 0.5678 g) were added and N-methylpyrrolidinone (NMP) was used as a solvent. After a reacting solution was stirred at 80° C. for two hours, Ni(COD)$^2$ (3.64 mmol, 1.0000 g) was added as a catalyst thereto, and the reacting solution was stirred for three hours.

A temperature was lowered to a room temperature, the reacting solution was precipitated in an aqueous hydrochloric acid solution, and a precipitated oligomer was washed several times with water and methanol. The washed oligomer was dried under vacuum at 80° C., to obtain a final oligomer.

SYNTHESIS EXAMPLE 2

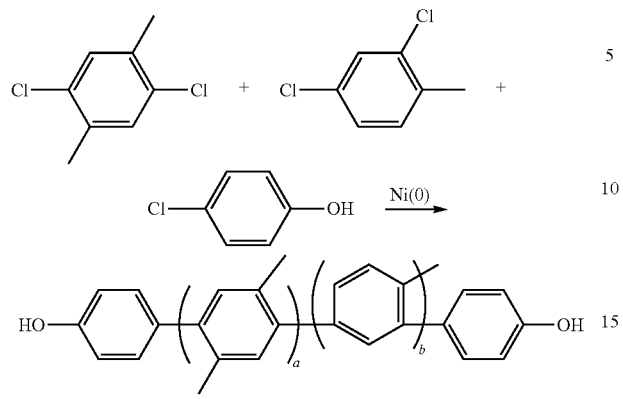

A three-neck flask was connected to a cold mechanical stirrer and purged with nitrogen. 2,5-Dichloro-p-xylene (0.26 mmol, 0.0463 g), 2,4-dichlorotoluene (1.06 mmol, 0.1703 g), 4-chlorophenol (0.11 mmol, 0.0138 g), and bipyridine (3.64 mmol, 0.5678 g) were added and NMP was used as a solvent. A reacting solution was stirred at 80° C. for two hours.

Ni(COD)$^2$ (3.64 mmol, 1.0000 g) was added as a catalyst thereto, and the reacting solution was stirred for three hours. A temperature was lowered to a room temperature, and the reacting solution was precipitated in an aqueous hydrochloric acid solution. A precipitated oligomer was washed several times with water and methanol. The washed oligomer was dried under vacuum at 80° C., to obtain a final oligomer.

EXAMPLE

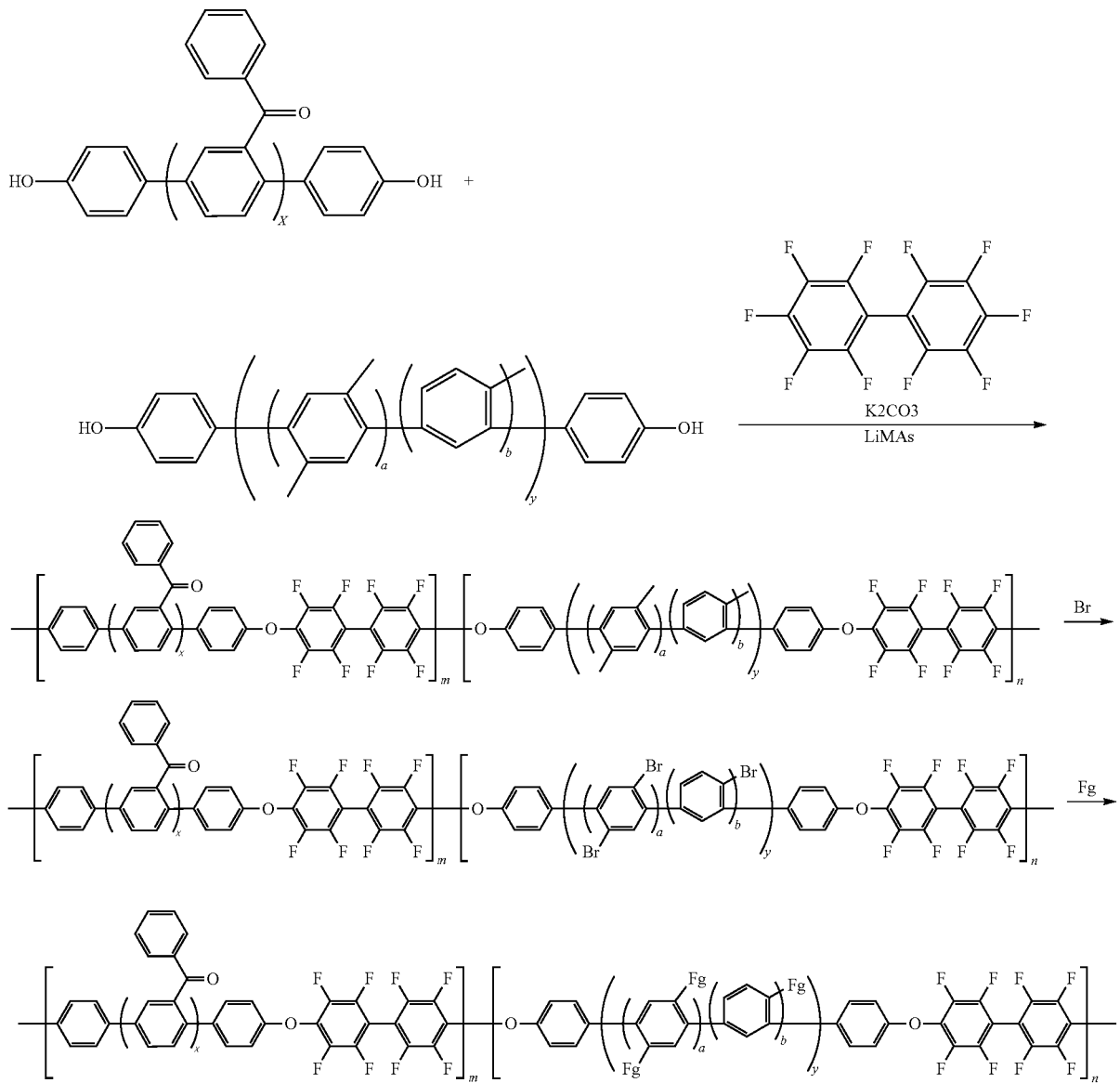

A three-neck flask was connected to a mechanical stirrer and a condenser with cooling water and purged with nitrogen. A hydrophilic precursor oligomer and a hydrophobic precursor oligomer obtained in Synthesis Examples 1 and 2, a polymer chain extension ring, and potassium carbonate as a catalyst were added, and dimethylacetamide (DMAc) was used as a solvent. A mixture was stirred at 120° C., the same state was maintained until a desired molecular weight is reached while performing monitoring using a gel permeation chromatography (GPC) every hour, and a reaction was terminated. A temperature of a polymer solution was lowered to a room temperature, and viscosity was reduced using DMAc. The polymer solution was precipitated in methanol to obtain a polymer, and the polymer was washed several times with water. The polymer was dried under vacuum at 100° C. and collected, and an ion-exchange functional group FG (for example, $(CF_2)SO_3H$) was introduced in the collected polymer by a selective bromination of a methyl group, to prepare a block copolymer. A molecular weight and a polydispersity index (PDI) of the prepared block copolymer were measured as shown in Table 1.

Comparative Example

An ion conductive block copolymer was prepared in the same manner as in Example except that a polymer chain extension ring is not introduced. A molecular weight and a PDI of the prepared ion conductive block copolymer were measured as shown in Table 1.

TABLE 1

| | Mn (kDa) | Mw (kDa) | PDI |
|---|---|---|---|
| Example | 55 | 151 | 2.73 |
| Comparative Example | 15 | 127 | 8.62 |

Referring to Table 1, it can be found that the ion conductive block copolymer prepared according to Example has a high molecular weight and has an excellent polydispersity.

According to an example embodiment, a multi-block copolymer may be synthesized by introducing a chain extension ring in a monomer and/or an oligomer, and thus it is possible to increase a molecular weight and to enhance mechanical properties and solubility. Also, it is possible to provide a block copolymer that is excellent in a chemical stability due to a hydrophilic-hydrophobic phase separation based on properties of the block copolymer in addition to phenylene properties. Furthermore, using the block copolymer, it is possible to provide an ion-exchange membrane that may enhance a performance of a fuel cell.

According to example embodiments, a block copolymer with a high molecular weight may be synthesized by introducing a polymer chain extension ring, and thus it is possible to enhance mechanical properties and solubility, to provide an excellent processability.

Also, according to example embodiments, it is possible to provide an ion conductive block copolymer that has a high ionic conductivity and that is excellent in mechanical properties and solubility. Also, it is possible to provide an ion-exchange membrane that has an excellent performance and an enhanced chemical stability due to an introduction of a phenylene structure by using the ion conductive block copolymer.

Although a few example embodiments of the present disclosure have been shown and described, the present disclosure is not limited to the described example embodiments. Instead, it would be appreciated by those skilled in the art that changes may be made to these example embodiments without departing from the principles and spirit of the present disclosure, the scope of which is defined by the claims and their equivalents.

What is claimed is:

1. A block copolymer comprising:
a hydrophobic repeating unit represented by Formula 1 below; and
a hydrophilic repeating unit represented by Formula 2 below:

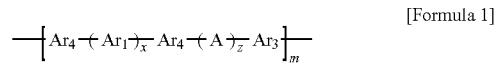

[Formula 1]

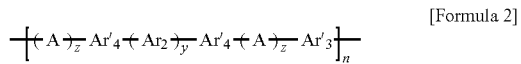

[Formula 2]

wherein in Formulae 1 and 2, n and m are each independently an integer of 1 to 1000, $Ar_1$ is an aromatic group including a single benzene ring or at least two benzene rings, the at least two benzene rings are directly connected to each other or are bonded to each other through a linking group selected from —O—, —S—, —S(O$_2$)—, —C(O)—, —(CF$_2$)$_n$—, —C(CH$_3$)$_2$—, —C(CF$_3$)$_2$—, an imide bond, an ether imide bond, phosphine, imidazole, or —(CH$_2$)$_n$— in which n is an integer of 1 to 10, each of the benzene rings is unsubstituted or substituted with —COR$_1$ or —CN, and R$_1$ is an aromatic group including at least one benzene ring;

$Ar_2$ is a benzene ring substituted with —COR$_2$ or —(CH$_2$)$_n$CH$_3$ in which n is an integer of 0 to 6, and R$_2$ is an aromatic group including at least one benzene ring that is unsubstituted or substituted with —(CH$_2$)$_n$CH$_3$ in which n is an integer of 0 to 6;

$Ar_3$ and $Ar'_3$ are each independently an aromatic group including a single benzene ring or at least two benzene rings, the at least two benzene rings are directly connected to each other or are bonded to each other through a linking group selected from —O—, —S—, —S(O$_2$)—, —C(O)—, —C(CH$_3$)$_2$—, —(CH$_2$)$_n$—, —C(CF$_3$)$_2$—, or —(CF$_2$)$_n$— in which n is an integer of 1 to 10, and each of the benzene rings is unsubstituted or substituted with a halogen ion, hydroxy, acetylene, or —(CH$_2$)$_n$CH$_3$ in which n is an integer of 0 to 6;

$Ar_4$ and $Ar'_4$ are the same as $Ar_1$ and $Ar_2$, or are

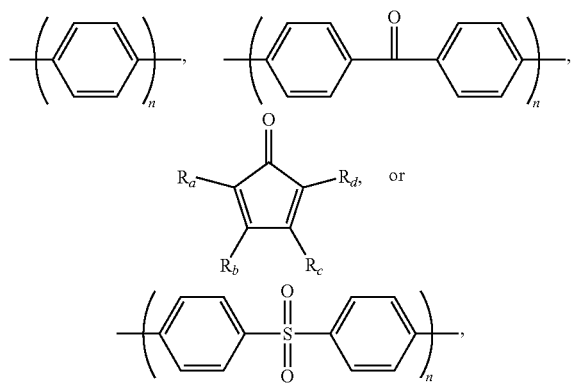

wherein n is an integer of 1 or 2, two of $R_a$ through $R_d$ are connected to a main chain of the block copolymer, and the rest are the same as or different from each other and are hydrogen, benzene or alkyl;

A is —O—, —S—, or —S(O$_2$)—;

z is an integer of 0 or 1; and x and y are each independently an integer of 1 to 100.

2. The block copolymer of claim 1, wherein $Ar_1$ is selected from the group consisting of:

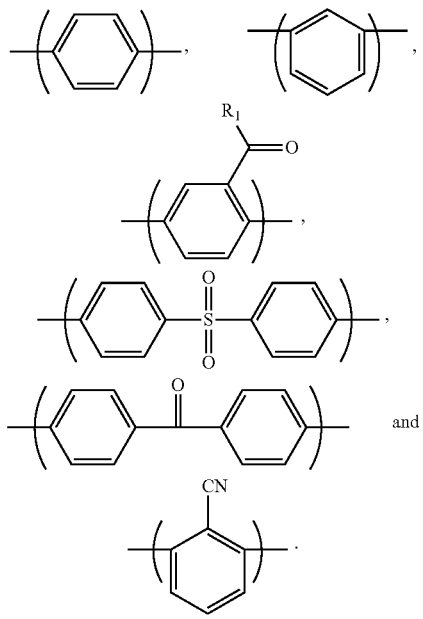

3. The block copolymer of claim 1, wherein $Ar_1$ is selected from the group consisting of:

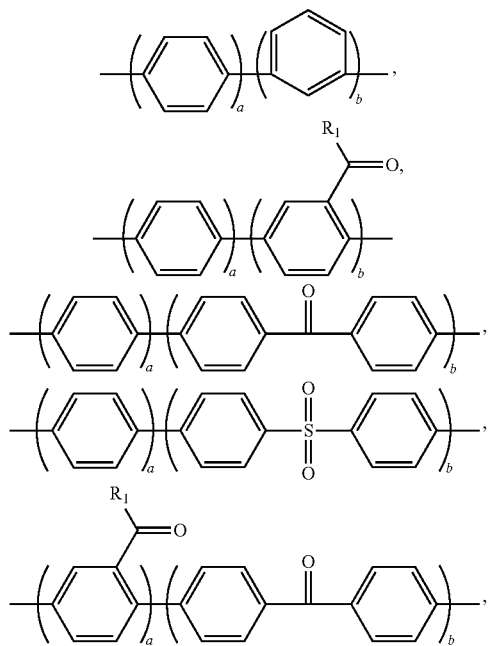

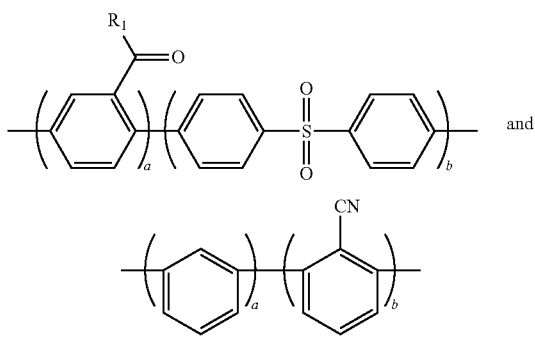

wherein a and b are each independently an integer of 1 to 100.

4. The block copolymer of claim 1, wherein $R_1$ is selected from the group consisting of:

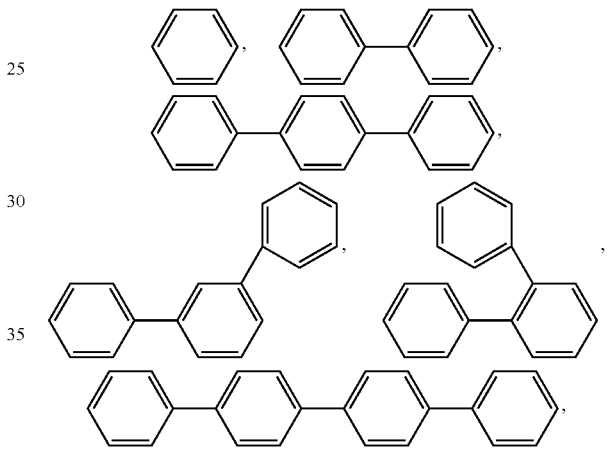

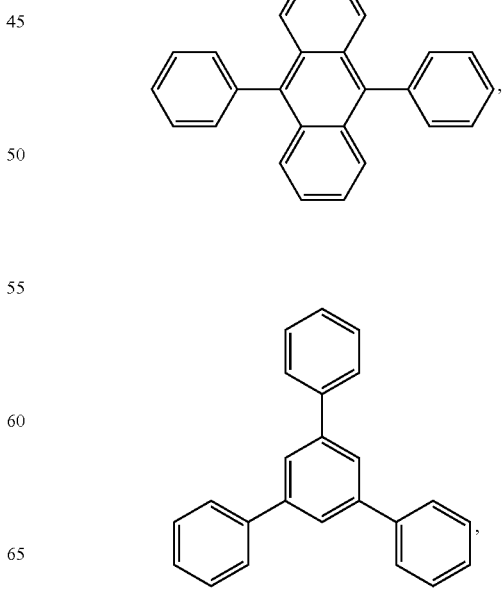

-continued
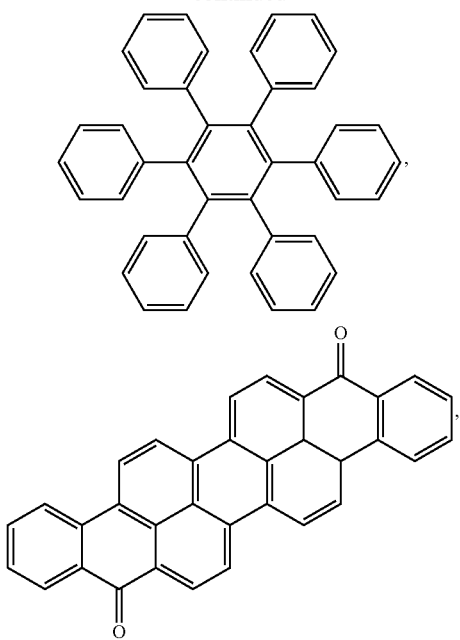
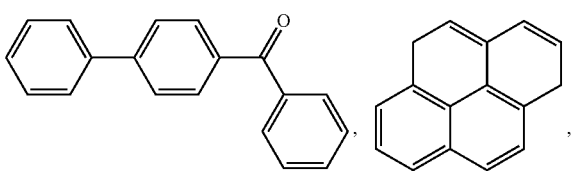
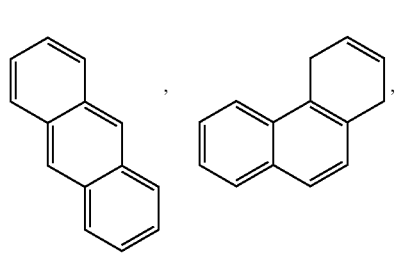
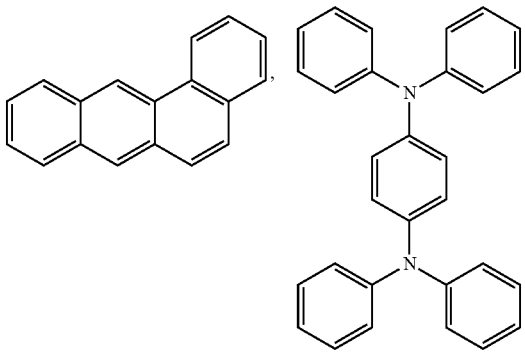
-continued
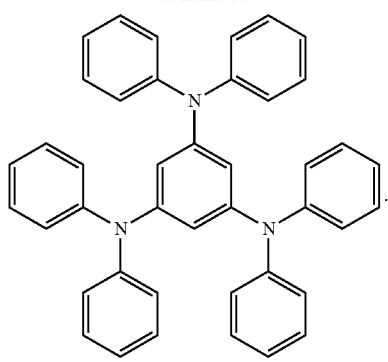
5. The block copolymer of claim 1, wherein $Ar_2$ is selected from the group consisting of:
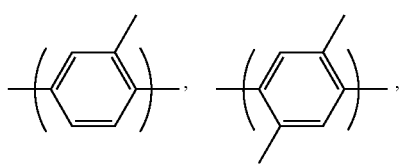
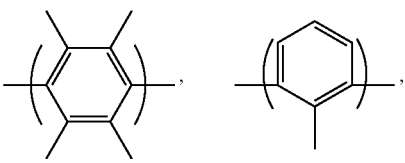
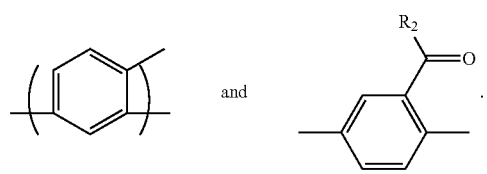
6. The block copolymer of claim 1, wherein $Ar_2$ is selected from the group consisting of:
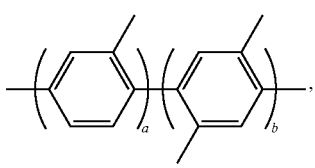
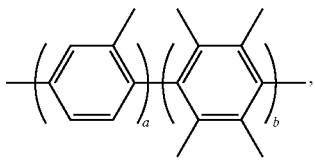
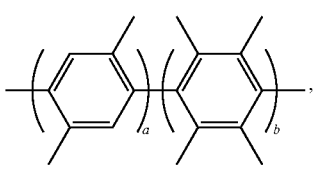

wherein a and b are each independently an integer of 1 to 100.

7. The block copolymer of claim 1, wherein $R_2$ is selected from the group consisting of:

8. The block copolymer of claim 1, wherein Ar3 and Ar'3 are each independently an aromatic group represented by Formulae 3a through 3d below:

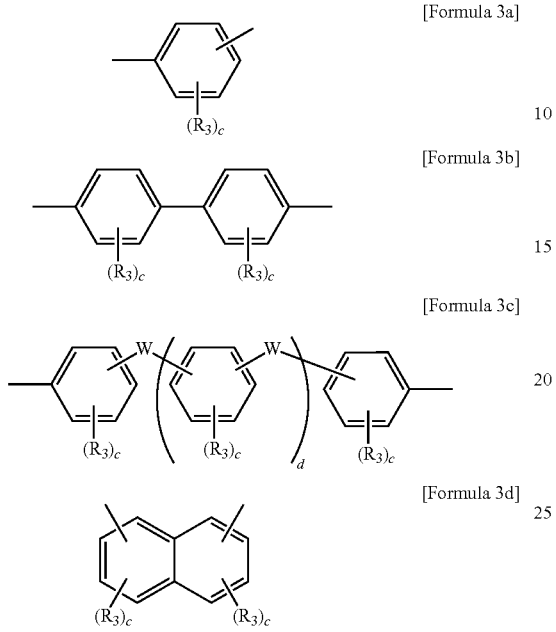

[Formula 3a]

[Formula 3b]

[Formula 3c]

[Formula 3d]

wherein $R_3$ is fluorine (F), chlorine (Cl), hydroxy, acetylene, or —$(CH_2)_nCH_3$ in which n is an integer of 0 to 10, W is —O—, —S—, —$S(O_2)$—, —C(O)—, —$C(CH_3)_2$—, —$(CH_2)_n$—, —$C(CF_3)_2$—, or —$(CF_2)_n$— in which n is an integer of 1 to 10, c is an integer of 0 to 4, and d is an integer of 0 to 100.

9. The block copolymer of claim 1, wherein $Ar_3$ and $Ar'_3$ are selected from the group consisting of:

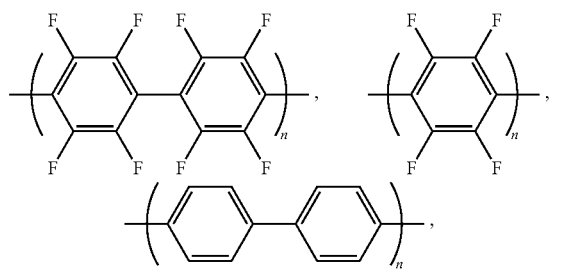

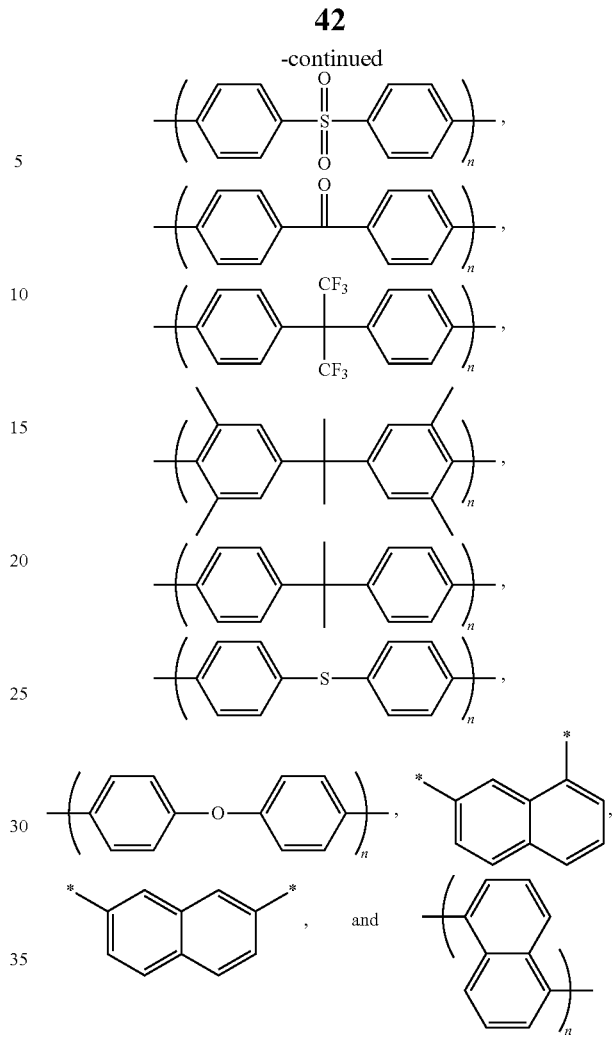

wherein n is an integer of 1 or 2.

10. The block copolymer of claim 1, wherein a repeating unit represented by Formula 1 is present in an amount of 50% by moles (mol %) to 95 mol %, and a repeating unit represented by Formula 2 is present in an amount of 5 mol % to 50 mol %, based on a total mole number of repeating units included in a polymer chain of the block copolymer.

11. A method of preparing the block copolymer of claim 1, the method comprising:
performing polymerization by adding a hydrophobic oligomer represented by Formula 4 below, a hydrophilic oligomer represented by Formula 5 below, and a chain extender, to prepare a block copolymer represented by Formula 7 below:

[Formula 4]

[Formula 5]

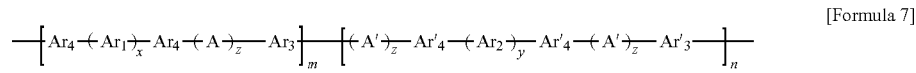

[Formula 7]

wherein R and R' are each independently a hydroxyl group (OH), fluorine (F), chlorine (Cl), bromine (Br), iodine (I), or

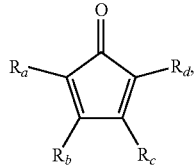

one of $R_a$ through $R_d$ is connected to $Ar_4$ or $Ar'_4$, respectively, and the rest are the same as or different from each other and are hydrogen, benzene or alkyl, and wherein in Formulae 4, 5, and 7, n and m are each independently an integer of 1 to 1000, $Ar_1$ is an aromatic group including a single benzene ring or at least two benzene rings, the at least two benzene rings are directly connected to each other or are bonded to each other through a linking group selected from —O—, —S—, —S($O_2$)—, —(C(O))—, —($CF_2$)$_n$—, —C($CH_3$)$_2$—, —C($CF_3$)$_2$—, an imide bond, an ether imide bond, phosphine, imidazole, or —($CH_2$)$_n$— in which n is an integer of 1 to 10, each of the benzene rings is unsubstituted or substituted with —$COR_1$ or —CN, and $R_1$ is an aromatic group including at least one benzene ring;

$Ar_2$ is a benzene ring substituted with —$COR_2$ or —($CH_2$)$_n$$CH_3$ in which n is an integer of 0 to 6, and $R_2$ is an aromatic group including at least one benzene ring that is unsubstituted or substituted with —($CH_2$)$_n$ $CH_3$ in which n is an integer of 0 to 6;

$Ar_3$ and $Ar'_3$ are each independently an aromatic group including a single benzene ring or at least two benzene rings, the at least two benzene rings are directly connected to each other or are bonded to each other through a linking group selected from —O—, —S—, —S($O_2$)—, —(C(O))—, —C($CH_3$)$_2$—, —($CH_2$)$_n$—, —C($CF_3$)$_2$—, or —($CF_2$)$_n$— in which n is an integer of 1 to 10, and each of the benzene rings is unsubstituted or substituted with a halogen ion, hydroxy, acetylene, or —($CH_2$)$_n$$CH_3$ in which n is an integer of 0 to 6;

$Ar_4$ and $Ar'_4$ are the same as $Ar_1$, and $Ar_2$ or are

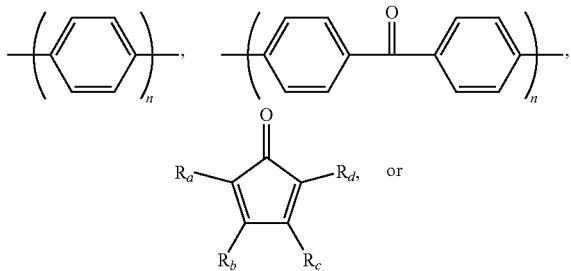

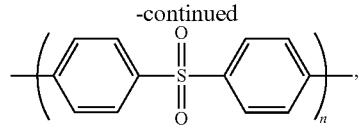

wherein n is an integer of 1 or 2, two of $R_a$ through $R_d$ are connected to a main chain of the block copolymer, and the rest are the same as or different from each other and are hydrogen, benzene or alkyl;

A is —O—, —S—, or —S($O_2$)—;

z is an integer of 0 or 1; and x and y are each independently an integer of 1 to 100.

12. The method of claim 11, wherein the chain extender comprises at least one selected from the group consisting of compounds represented by Formulae 6a through 6d below:

[Formula 6a]

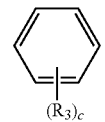

[Formula 6b]

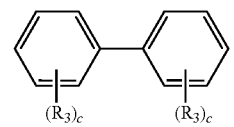

[Formula 6c]

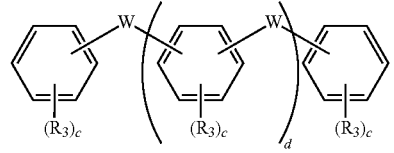

[Formula 6d]

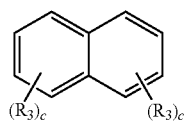

wherein $R_3$ is F, Cl, OH, acetylene, [[—($CH_2$)$_n$—]] or —($CH_2$)$_n$$CH_3$ in which n is an integer of 0 to 10, W is —O—, —S—, —S($O_2$)—, —(C(O))—, —C($CH_3$)$_2$—, —($CH_2$)$_n$—, —C($CF_3$)$_2$—, or —($CF_2$)$_n$— in which n is an integer of 0 to 6, c is an integer of 0 to 4, and d is an integer of 0 to 100.

13. The method of claim 11, wherein the hydrophobic oligomer represented by Formula 4 and the hydrophilic oligomer represented by Formula 5 have a polydispersity (PD) less than or equal to 3.

* * * * *